United States Patent
Takahashi et al.

(10) Patent No.: US 8,760,722 B2
(45) Date of Patent: Jun. 24, 2014

(54) APPARATUS AND METHOD FOR PROCESSING IMAGES

(71) Applicant: Fujitsu Limited, Kawasaki (JP)

(72) Inventors: Jun Takahashi, Kawasaki (JP); Shohei Nakagata, Kawasaki (JP); Kensuke Kuraki, Ichikawa (JP); Taizo Anan, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 13/719,549

(22) Filed: Dec. 19, 2012

(65) Prior Publication Data

US 2013/0100502 A1 Apr. 25, 2013

Related U.S. Application Data

(63) Continuation of application No. PCT/JP2010/060805, filed on Jun. 25, 2010.

(51) Int. Cl.
*G06F 15/00* (2006.01)
*G06K 1/00* (2006.01)
*G06K 15/02* (2006.01)

(52) U.S. Cl.
USPC .......................................... 358/1.9; 358/1.11

(58) Field of Classification Search
CPC G06K 15/1848; H04N 1/3871; H04N 1/4486
USPC .......................... 358/1.1–1.9, 1.11–1.18, 3.28
See application file for complete search history.

(56) References Cited

U.S. PATENT DOCUMENTS

| | | | |
|---|---|---|---|
| 5,726,435 A | 3/1998 | Hara et al. | |
| 7,162,035 B1 * | 1/2007 | Durst et al. | 380/54 |
| 7,162,038 B1 | 1/2007 | Winterer et al. | |
| 8,384,792 B2 * | 2/2013 | Ogawa | 348/222.1 |
| 2005/0235163 A1 * | 10/2005 | Forlenza et al. | 713/193 |
| 2009/0214033 A1 * | 8/2009 | Nakagata et al. | 380/243 |
| 2009/0238361 A1 | 9/2009 | Anan et al. | |
| 2009/0262931 A1 | 10/2009 | Nakagata et al. | |
| 2009/0323950 A1 | 12/2009 | Nakagata et al. | |

FOREIGN PATENT DOCUMENTS

| | | | |
|---|---|---|---|
| EP | 2079228 | | 7/2009 |
| EP | 2093995 | | 8/2009 |
| EP | 2 106 119 | | 9/2009 |
| EP | 2106119 | * | 9/2009 |
| JP | 7-254037 | | 10/1995 |
| JP | 2002-329163 | | 11/2002 |

(Continued)

OTHER PUBLICATIONS

Patent Abstracts of Japan, Publication No. 07-254037, Published Oct. 3, 1995.

(Continued)

*Primary Examiner* — King Poon
*Assistant Examiner* — Ibrahim Siddo
(74) *Attorney, Agent, or Firm* — Staas & Halsey LLP

(57) ABSTRACT

An area designation unit designates a processing area within an input image. An image processing unit performs predetermined processing on the processing area. A marker area detection unit detects a marker area in the input image, the marker area being capable of accommodating a marker that demarcates the processing area. A marking unit determines a position in the marker area for placing the marker, based on priority conditions.

12 Claims, 35 Drawing Sheets

(56) References Cited

FOREIGN PATENT DOCUMENTS

| | | |
|---|---|---|
| JP | 2005-327266 | 11/2005 |
| JP | 2007-323632 | 12/2007 |
| JP | 2008-301044 | 12/2008 |
| JP | 2009-200847 | 9/2009 |
| JP | 2009-232233 | 10/2009 |
| KR | 10-2010-0006736 | 1/2010 |
| WO | WO 2008/053576 | 5/2008 |

OTHER PUBLICATIONS

Patent Abstracts of Japan, Publication No. 2008-301044, Published Dec. 11, 2008.

Patent Abstracts of Japan, Publication No. 2009-232233, Published Oct. 8, 2009.

Patent Abstracts of Japan, Publication No. 2009-200847, Published Sep. 3, 2009.

Patent Abstracts of Japan, Publication No. 2007-323632, Published Dec. 13, 2007.

Patent Abstracts of Japan, Publication No. 2002-329163, Published Nov. 15, 2002.

Patent Abstracts of Japan, Publication No. 2005-327266, Published Nov. 24, 2005.

International Search Report of PCT/JP2010/060805 mailed Jul. 20, 2010.

Extended European Search Report dated Jul. 10, 2013 in Appln. No. 10853663.2.

Korean Office Action mailed Jan. 16, 2014, in corresponding Korean Application 10-2012-7033333.

* cited by examiner

FIG. 26
[ST1]
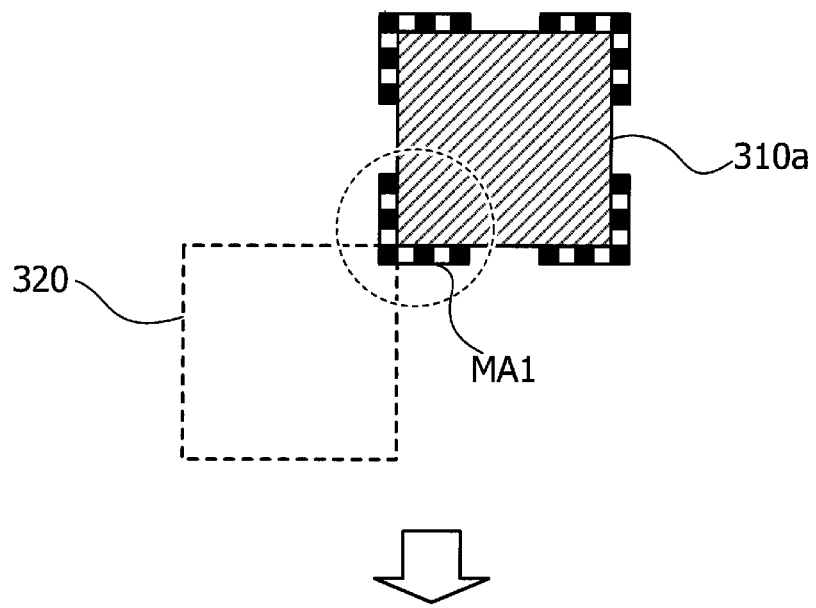
[ST2]
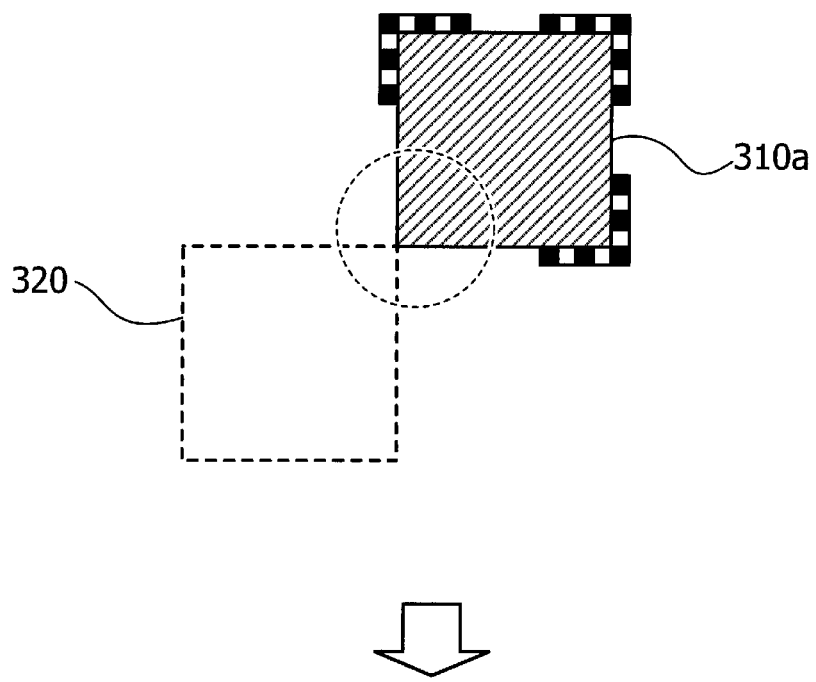

FIG. 27
[ST3]
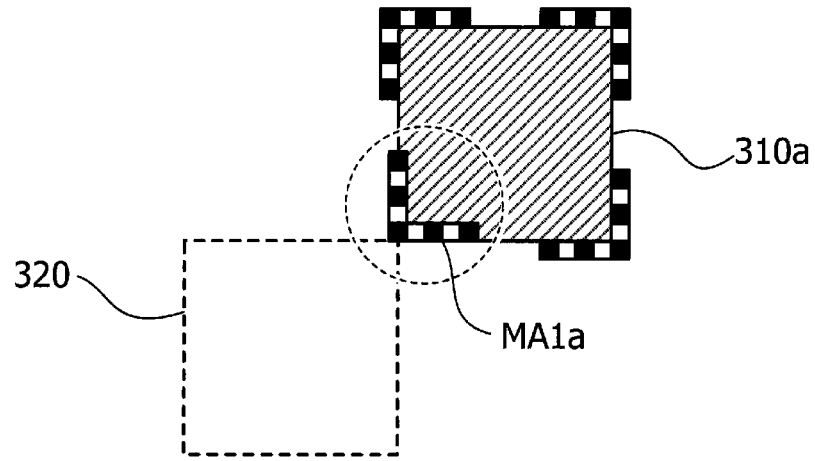
[ST4]
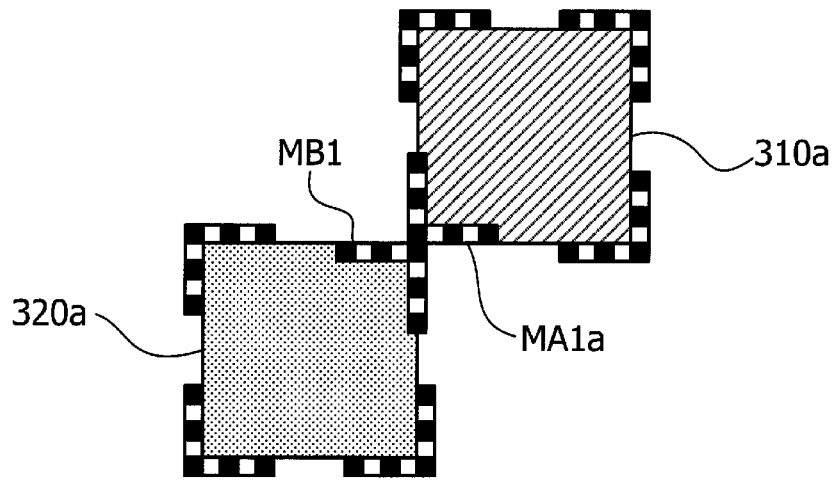

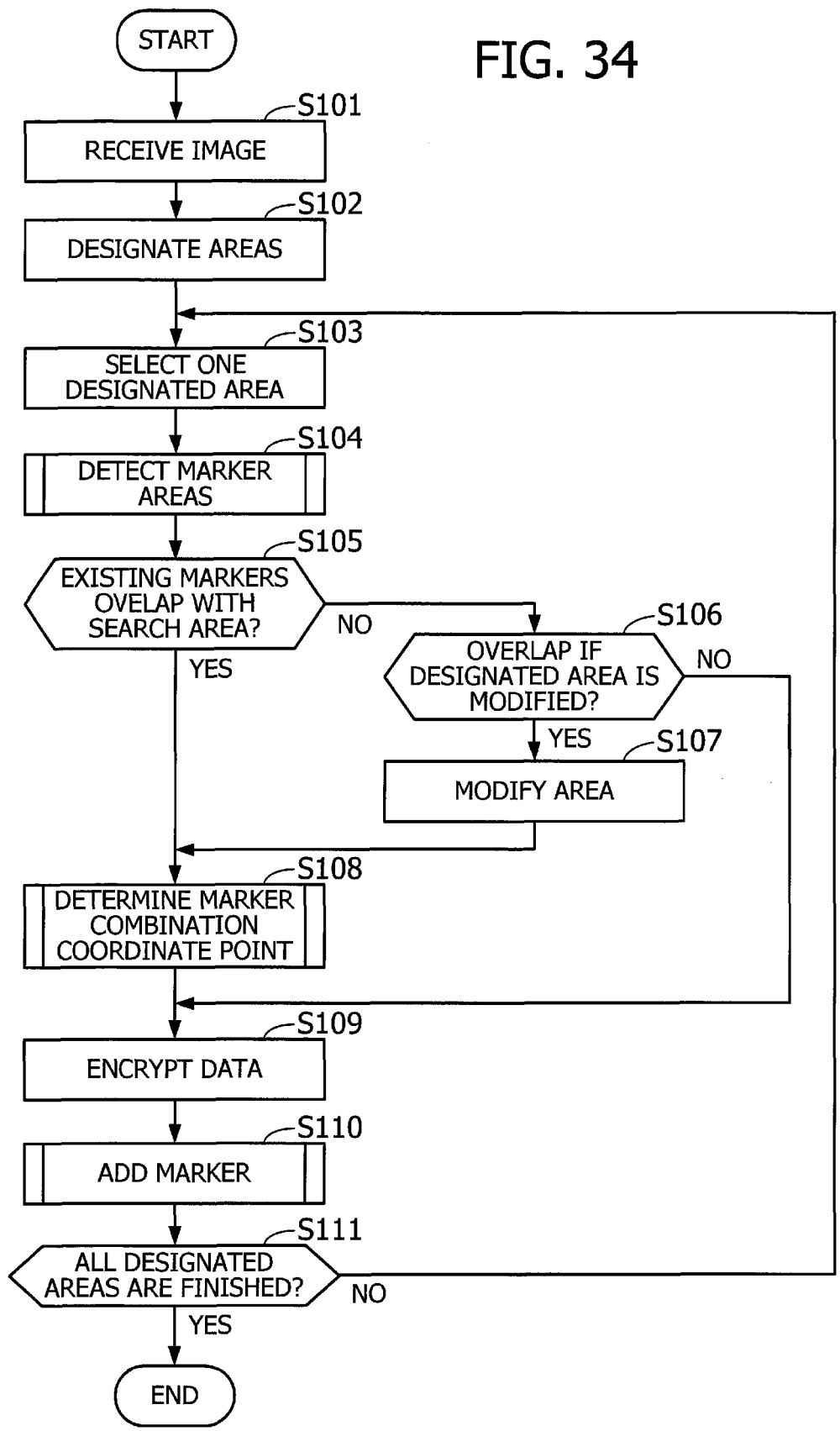

APPARATUS AND METHOD FOR PROCESSING IMAGES

CROSS-REFERENCE TO RELATED APPLICATION

This application is a continuation application of International Application PCT/JP2010/060805 filed on Jun. 25, 2010 and designated the U.S., the entire contents of which are incorporated herein by reference.

FIELD

The embodiments discussed herein relate to an apparatus and method for processing images.

BACKGROUND

There are some existing techniques that add a two-dimensional code as part of a printed document to embed some information (e.g., character strings) in coded form. A reading device captures this two-dimensional code on the printed document and decodes the read data to reconstruct the original information such as character strings.

Data encryption may be used to conceal a particular part of image data or text data. When partially encrypted image data is printed on some medium, the encrypted information appears in a deformed fashion on the resulting printed medium. To obtain its original information, a reading device is used to capture and decode the encrypted part of the printed medium. Such data encryption is applied to, for example, a confidential portion of documents to reduce the risk of information leakage via printed media.

Some of the existing devices for reading two-dimensional codes and encrypted part (hereafter "coded portion") are designed to identify which area to decode on the basis of markers located at four corners (or some of them) of a two-dimensional code or coded portion.
Japanese Laid-open Patent Publication No. 07-254037
Japanese Laid-open Patent Publication No. 2008-301044
Japanese Laid-open Patent Publication No. 2009-232233

There may be a need for printing a plurality of coded portions on a single medium. This need arises when, for example, confidential information is distributed in two or more sections of a document. In the case where those coded portions are closely located, the markers to be attached to one coded portion could overlap with other coded portions or other existing markers. Such overlaps would cause a reading device to fail in reconstructing the information for the following reasons: (1) unable to detect markers because of their mutual overlaps, or (2) unable to distinguish individual coded portions because markers are combined incorrectly.

SUMMARY

According to an aspect of the embodiments, an image processing apparatus includes: an area designation unit configured to designate a processing area within an input image; an image processing unit configured to perform predetermined processing on the processing area; a marker area detection unit configured to detect a marker area in the input image, the marker area being capable of accommodating a marker that demarcates the processing area; and a marking unit configured to determine a position in the marker area for placing the marker, based on priority conditions.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWING

FIG. 26 illustrates how markers are placed according to the third embodiment;

FIG. 27 also illustrates how markers are placed according to the third embodiment;

FIG. 34 is a flowchart illustrating a variation of the encryption process according to the fourth embodiment.

DESCRIPTION OF EMBODIMENTS

Several embodiments of the present invention will be described in detail below with reference to the accompanying drawings.

First Embodiment

Figure 1:
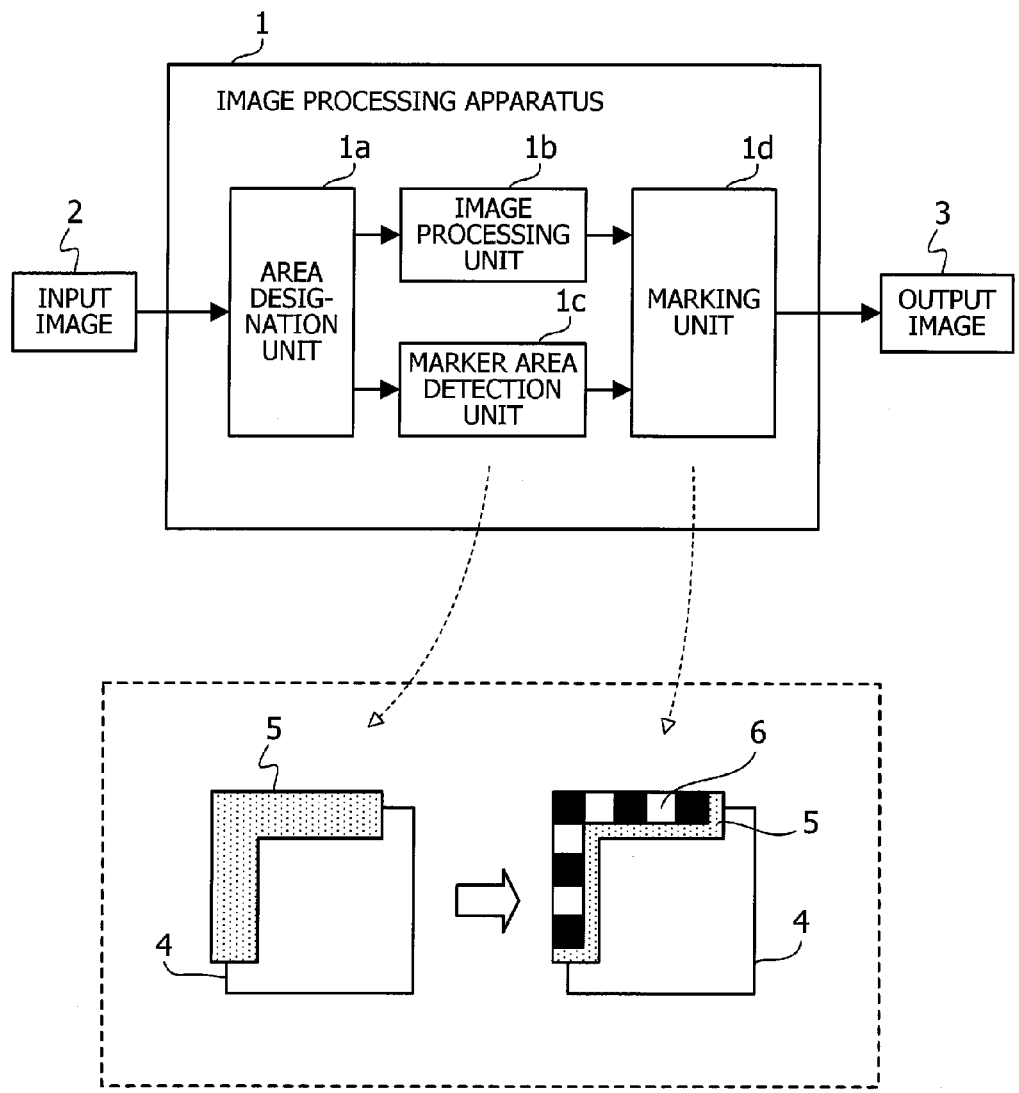
FIG. 1 illustrates an image processing apparatus according to a first embodiment.

FIG. 1 illustrates an image processing apparatus according to a first embodiment. The illustrated image processing apparatus 1 includes an area designation unit 1a, an image processing unit 1b, a marker area detection unit 1c, and a marking unit 1d.

The area designation unit 1a designates a processing area 4 within an input image 2. For example, the area designation unit 1a may receive a user input that specifies a particular area in the input image 2. The area designation unit 1a designates this area as a processing area 4. The area designation unit 1a may also be configured to designate a processing area 4 that has been determined previously.

The image processing unit 1b performs predetermined image processing on the processing area 4 designated by the area designation unit 1a. The image processing may include, for example, encrypting image data, adding two-dimensional codes, and encoding image data with a compression ratio that is different from those applied to other areas of the image.

The marker area detection unit 1c detects a marker area 5 in the input image 2. This marker area 5 is an area capable of accommodating a marker 6 to demarcate the processing area 4 when printed on some medium as part of an output image. The marker 6 is a piece of image to be placed on the periphery of the processing area 4, in order to help a reading device to identify the processing area 4 in the printed output image. The marker 6 may have various shapes. For example, an L-shaped marker may be placed at each of the four corners of the processing area 4, with its pixel values arranged in a predetermined pattern. Other exemplary markers may take a round shape or a rectangular shape having a predetermined pixel pattern, similarly placed at each corner of the processing area 4.

The marker area detection unit 1c detects a marker area 5 from, for example, inside the processing area 4, as well as from the periphery of the same. For example, there are several potential areas for placement of markers, and they are previously defined depending on the shape of markers. The marker area detection unit 1c excludes some positions in those areas as being unsuitable for markers 6 when these positions overlap with (1) other processing areas than the processing area 4 of interest, or (2) other makers demarcating processing areas other than the processing area 4 of interest. That is, the marker area detection unit 1c detects a marker area 5 by removing the positions that satisfy the condition (1) or (2).

The marking unit 1d determines where in the marker area 5 to place a marker 6, on the basis of a set of priority conditions. The priority conditions may be previously specified. For example, a marker position is given a higher priority when it does not overlap with the processing area 4. The marking unit 1d has been configured with such predetermined priority conditions. Based on the above determination, the marking unit 1d places a marker 6 in the image processed by the image processing unit 1b, thus producing an output image 3.

In operation of the above image processing apparatus 1, the area designation unit 1a designates a processing area 4 in an input image 2 that is received. The image processing unit 1b performs predetermined image processing on the designated processing area 4. The marker area detection unit 1c detects a marker area 5 capable of accommodating a marker 6 to demarcate the processing area 4. The marking unit 1d determines where in the marker area 5 to place a marker 6 on the basis of a predetermined set of priority conditions.

As a result of the above operation, markers are placed properly to demarcate a processing area 4 to be encoded. For example, markers 6 can be located in an appropriate place not overlapping with other processing areas. When the resulting output image 3 is printed on a medium, these markers 6 help a reading device to capture the data on the printed medium.

The input image 2 may include a plurality of processing areas. It has conventionally been unavoidable in such a case to separate those processing areas with sufficient distances, so that a reading device can recognize their markers properly. In contrast, the method proposed above makes it possible to lay out such processing areas closely together, and it thus reduces the space for arranging, for example, a plurality of two-dimensional codes, besides allowing encryption of those adjoining areas.

More specific embodiments of the above image processing apparatus 1 will be discussed below. These embodiments assume that their proposed techniques are applied to an information processing system that protects printed media from information leakage.

Second Embodiment

Figure 2:
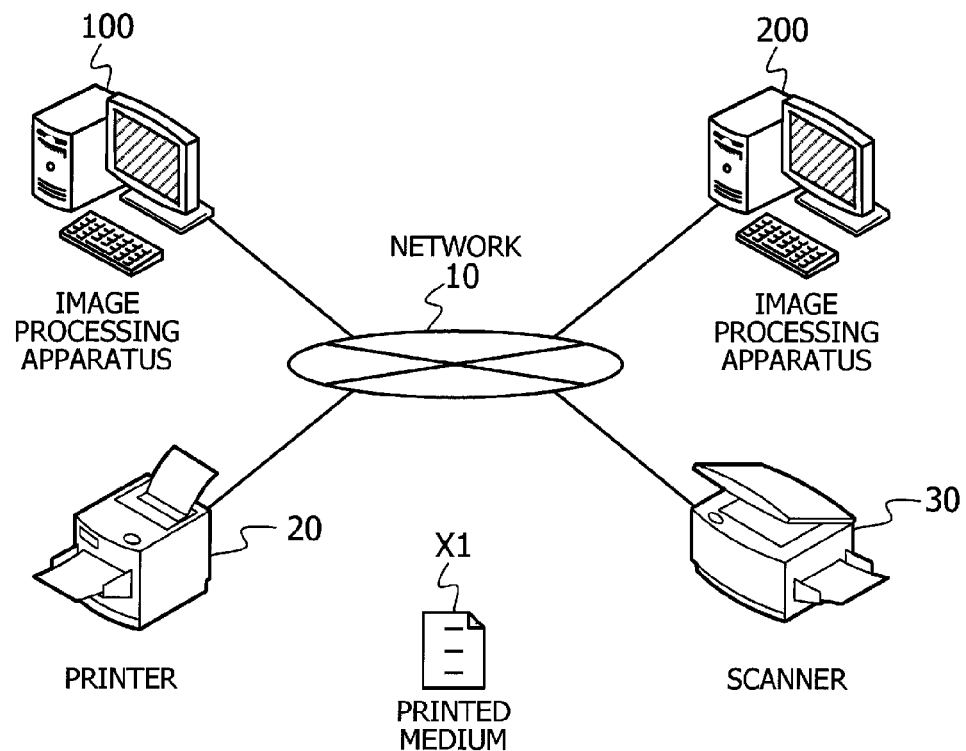
FIG. 2 illustrates an information processing system according to a second embodiment.

FIG. 2 illustrates an information processing system according to a second embodiment. This information processing system includes a printer 20, a scanner 30, and image processing apparatuses 100 and 200 connected via a network 10.

The network 10 may be an intranet or the Internet.

The printer 20 is an output device for producing printed media X1.

The scanner 30 is an input device for capturing image data printed on a printed medium X1.

The image processing apparatuses 100 and 200 are computers configured to process image data. Specifically, these image processing apparatuses 100 and 200 cause the printer 20 to print image data. The image processing apparatuses 100 and 200 receive image data captured by the scanner 30. The image processing apparatuses 100 and 200 encrypt a part of the received image data.

The original information contained in an encrypted portion does not appear in comprehensible form on a printed medium X1. Thus it is not possible for a third party to reach the content even if the printed medium X1 is accessible to them. In other words, leakage of information through such printed media X1 is less likely.

The following description assumes that one image processing apparatus 100 encrypts a part of given image data and the other image processing apparatus 200 decrypts that part of the image data. While they play different roles, the former image processing apparatus 100 may include the same functions as the latter image processing apparatus 200. Similarly the latter image processing apparatus 200 may include the same functions as the former image processing apparatus 100.

Figure 3:
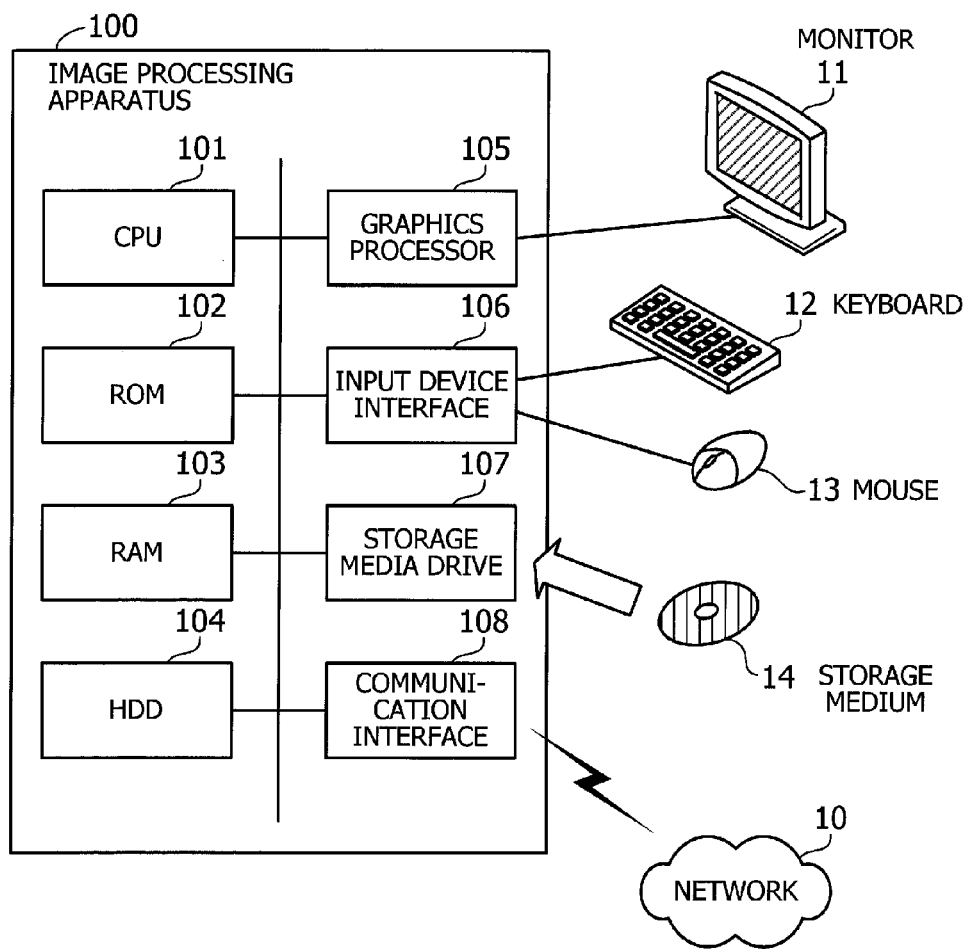
FIG. 3 illustrates a hardware configuration of an image processing apparatus according to the second embodiment.

FIG. 3 illustrates a hardware configuration of an image processing apparatus according to the second embodiment. This image processing apparatus 100 includes a central processing unit (CPU) 101, a read-only memory (ROM) 102, a random access memory (RAM) 103, a hard disk drive (HDD) 104, a graphics processor 105, an input device interface 106, a storage media drive 107, and a communication interface 108.

The CPU 101 controls the image processing apparatus 100 as a whole.

The ROM 102 stores, for example, a basic input/output system (BIOS) program of the image processing apparatus 100.

The RAM 103 serves as temporary storage for at least part of operating system (OS) programs and application software (hereafter "applications") that the CPU 101 executes, as well as for various data that the CPU 101 uses when executing the programs.

The HDD 104 stores OS programs and application programs. The HDD 104 also stores various data that the CPU 101 needs for its processing operation. Solid state drives (SSD) or other type of storage devices may be used in place of, or together with the HDD 104.

The graphics processor 105, coupled to a monitor 11, produces video images in accordance with drawing commands from the CPU 101 and displays them on a screen of the monitor 11.

The input device interface 106 is connected to a keyboard 12 and a mouse 13 and supplies signals from those devices to the CPU 101.

The storage media drive 107 is a device used to read data in a storage medium 14. For example, the functions that the image processing apparatus 100 is supposed to provide may be encoded as computer programs to be run on a computer system. These programs may be recorded on a computer-readable storage medium 14 for the purpose of distribution. The programs may also be stored in a program distribution server (not illustrated) which is linked to a network 10. In this case, the image processing apparatus 100 can download programs from the program distribution server via the network 10.

The storage medium 14 may be, for example, a magnetic storage device, optical disc, magneto-optical storage medium, or semiconductor memory device. Magnetic storage devices include hard disk drives (HDD), flexible disks (FD), and magnetic tapes, for example. Optical discs include, for example, compact disc (CD), CD-Recordable (CD-R), CD-Rewritable (CD-RW), digital versatile disc (DVD), DVD-R, DVD-RW, and DVD-RAM. Magneto-optical storage media include magneto-optical discs (MO), for example. Semiconductor memory devices include, for example, flash memory devices such as Universal Serial Bus (USB) flash drives.

The communication interface 108 is connected to the network 10 to exchange data with a printer 20, scanner 30, and other information processing apparatuses.

The above hardware configuration of the image processing apparatus 100 may also be used to realize the other image processing apparatus 200.

Figure 4:
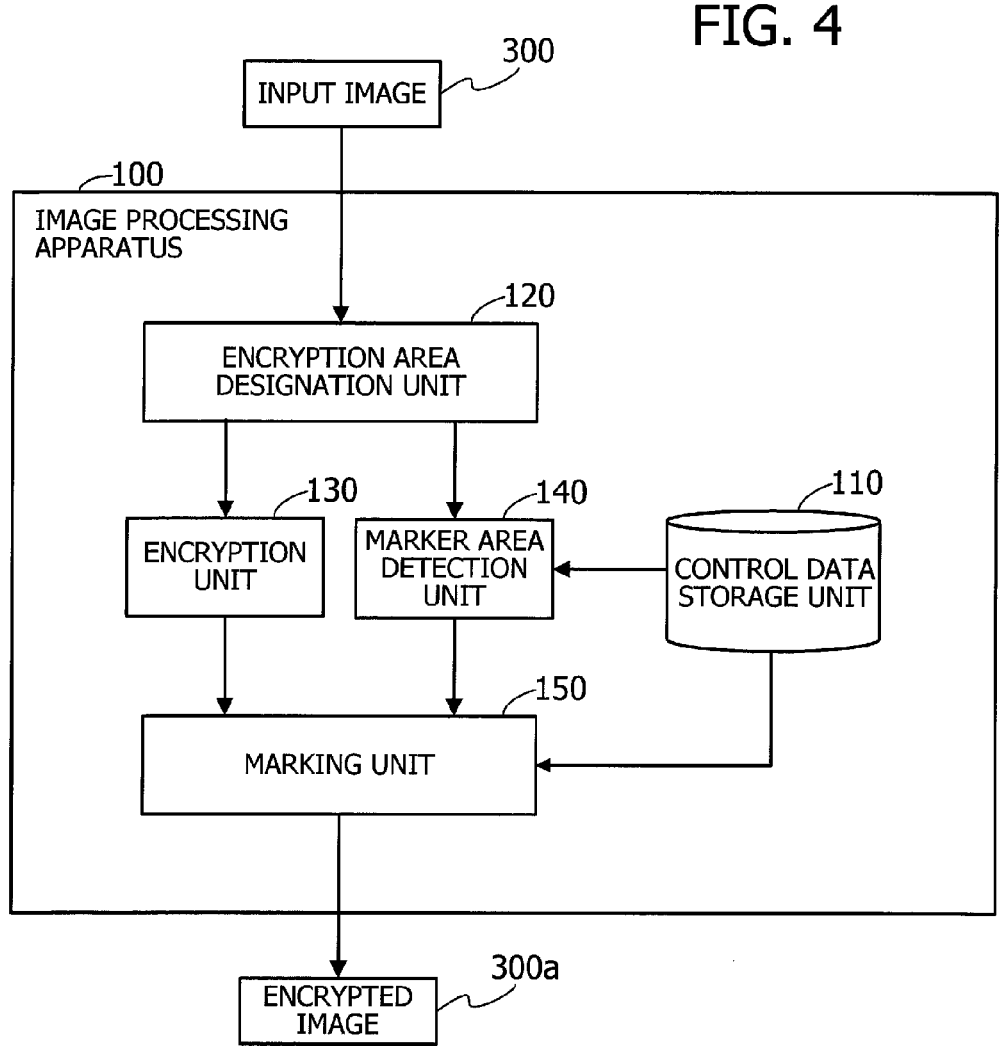
FIG. 4 is a first diagram illustrating a functional structure of the image processing apparatus according to the second embodiment.

FIG. 4 is a first diagram illustrating a functional structure of the image processing apparatus according to the second embodiment. The illustrated image processing apparatus 100 includes a control data storage unit 110, an encryption area designation unit 120, an encryption unit 130, a marker area detection unit 140, and a marking unit 150. These functions are realized as programs executed by the CPU 101. Alternatively, all or part of those functions may be implemented as a dedicated hardware device(s).

The control data storage unit 110 stores control data used to determine the position of markers for locating an encryption area. The control data includes the following information:

(A1) Information describing search areas in which it is determined whether a marker can be placed or not, depending on the shape of markers.

(A2) Information describing priority conditions used to determine the position of markers, within a marker area extracted as part of a search area as being capable of accommodating markers.

(A3) Information indicating the positions of other existing encryption areas in the same image and their respective markers.

The encryption area designation unit 120 receives an input image 300 as source data. The encryption area designation unit 120 also receives a user input designating which areas in the input image 300 to protect with encryption. The encryption area designation unit 120 informs the encryption unit 130 and marker area detection unit 140 of these areas (hereafter "designated areas").

The encryption area designation unit 120 stores the received input image 300 in an area of RAM 103, for example. The encryption area designation unit 120, encryption unit 130, marker area detection unit 140 and marking unit 150 perform various operations (described below) on the input image 300 by manipulating the stored data in the RAM 103.

The encryption unit 130 encrypts each designated area of the input image 300 by using a predetermined cryptographic key. The cryptographic key may previously be given to and held by the encryption unit 130. Alternatively, the user may be prompted to enter a key phrase for use as the cryptographic key for encryption.

The marker area detection unit 140 determines a marker area for each designated area informed of by the encryption area designation unit 120, based on the control data stored in the control data storage unit 110. Some areas may overlap with other encryption areas or their markers. The marker area detection unit 140 does not select such areas as marker areas. The marker area detection unit 140 outputs determined marker areas to the marking unit 150.

From among these marker areas supplied from the marker area detection unit 140, the marking unit 150 determines positions for placing markers in the input image 300 encrypted by the encryption unit 130, based on the above control data in the control data storage unit 110. The marking unit 150 places a marker at each determined position, thus producing and outputting an encrypted image 300a.

The image processing apparatus 100 accepts a print command from the user and causes the printer 20 to print the encrypted image 300a accordingly. The resulting printed medium X1 includes the encrypted image 300a.

To browse an encrypted part of the printed media X1, the user causes his or her image processing apparatus 200 to decrypt the encrypted image 300a. To this end, the user operates a scanner 30 to read out what is recorded on the printed media X1. The scanner 30 captures the encrypted image 300a, and supplies the image processing apparatus 200 with the captured image. An alternative method for capturing such an encrypted image 300a on printed media X1 is to use a digital still camera or an integrated camera function of a cellular phone, PC, or other information technology device.

Figure 5:
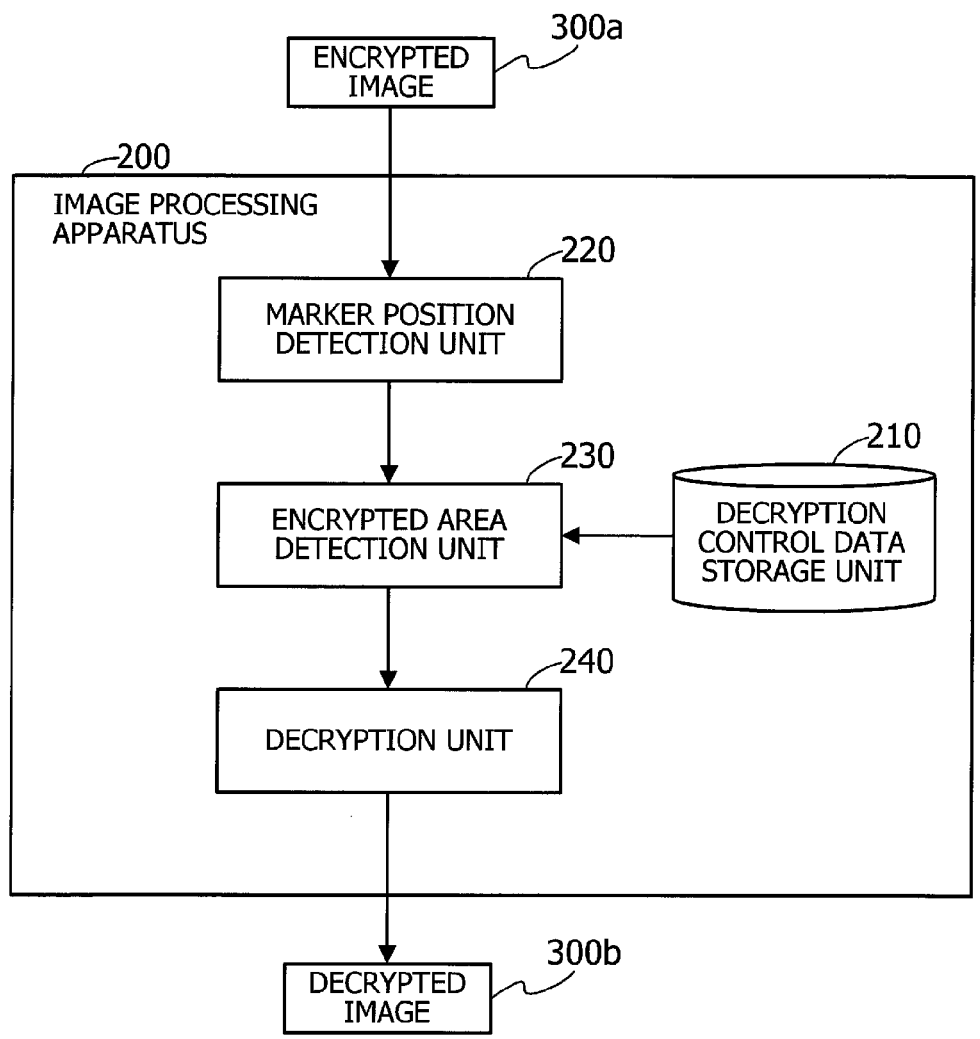
FIG. 5 is a second diagram illustrating a functional structure of the image processing apparatus according to the second embodiment.

FIG. 5 is a second diagram illustrating a functional structure of the image processing apparatus according to the second embodiment. The illustrated image processing apparatus 200 includes a decryption control data storage unit 210, a marker position detection unit 220, an encrypted area detection unit 230, and a decryption unit 240. These functions are realized as programs executed by a CPU in the image processing apparatus 200. Alternatively, all or part of these functions may be implemented as a dedicated hardware device(s).

The decryption control data storage unit 210 stores data used to detect markers for locating an encrypted area. This decryption control data may include the following information:

(B1) Information for determining priority conditions from marker positions (this information corresponds to what has previously been described as control data (A2) stored in the control data storage unit 110).

(B2) Information defining the shape and color pattern of markers to be placed by the image processing apparatus 100.

The marker position detection unit 220 is responsive to input of an encrypted image 300a. In response, the marker position detection unit 220 detects the position of each marker by searching the encrypted image 300a for a predetermined pattern, using pattern matching or other generally known techniques. The marker position detection unit 220 informs the encrypted area detection unit 230 of the detected marker positions.

The marker position detection unit 220 stores data of the encrypted image 300a in a predetermined area of RAM in the image processing apparatus 200. The marker position detection unit 220, encrypted area detection unit 230, and decryption unit 240 perform their respective processing functions (described below) on the encrypted image 300a by manipulating this data in the RAM area.

The encrypted area detection unit 230 detects encrypted areas in the encrypted image 300a, based on marker positions detected by the marker position detection unit 220, as well as on decryption control data stored in the decryption control data storage unit 210. The encrypted area detection unit 230 informs the decryption unit 240 of the detected encrypted areas.

The decryption unit 240 decrypts an encrypted area in the encrypted image 300a by using a predetermined cryptographic key. The cryptographic key for this purpose may previously be provided to the decryption unit 240. Alternatively, the user may be prompted to enter a key phrase for use as the cryptographic key for decryption. The decryption unit 240 produces and outputs a decrypted image 300b as a result of its decryption processing.

The image processing apparatus 200 outputs the decrypted image 300b on, for example, a monitor coupled to the image processing apparatus 200. This display on the monitor screen permits the user to browse information in encrypted areas of the printed medium X1.

Figure 6A:
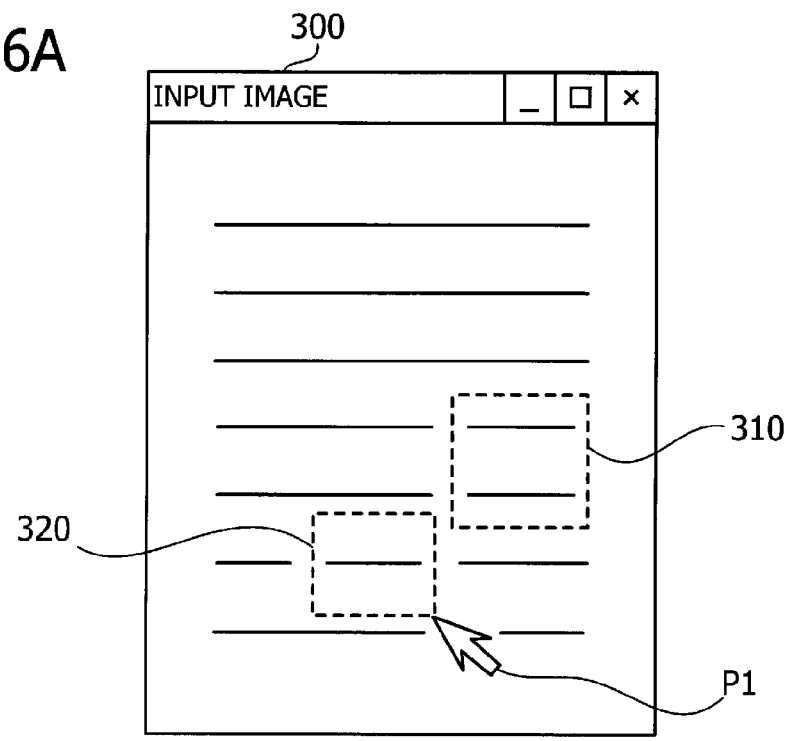
FIGS. 6A and 6B illustrate images including encryption areas or encrypted areas.
Figure 6B:
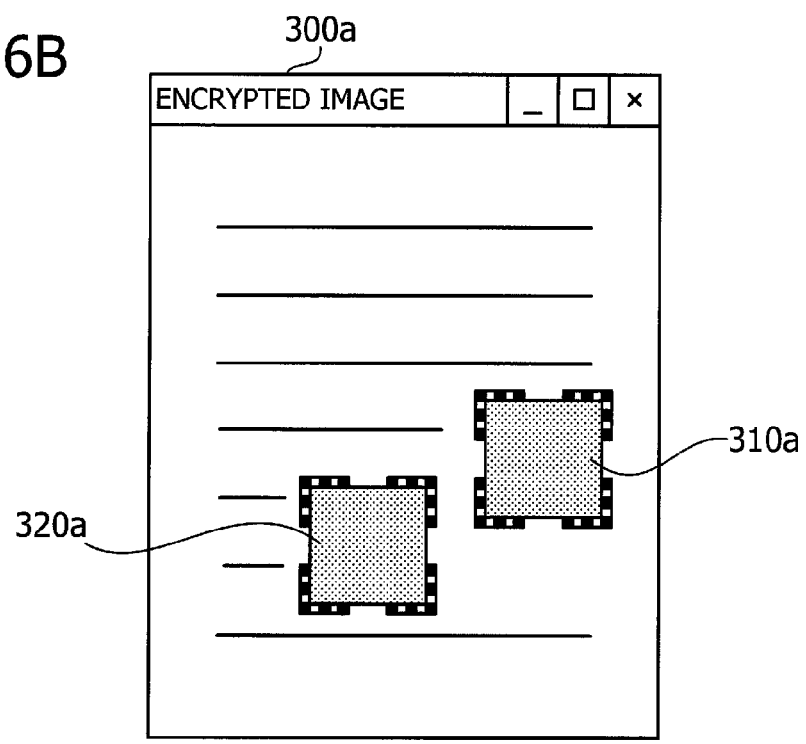

FIGS. 6A and 6B illustrate images including encryption areas or encrypted areas. FIG. 6A illustrates an example of an input image 300. FIG. 6B illustrates an example of an encrypted image 300a.

The encryption area designation unit 120 permits the user to designate some particular areas in the input image 300. For example, the input image 300 may include such designated areas 310 and 320. The user designates these areas 310 and 320 by manipulating a mouse 13 and dragging pointer P1 in the input image 300 seen on the monitor 11, so that each area 310 and 320 can be selected.

The user may further enter an input command to the image processing apparatus 200 to initiate encryption of data. For example, some buttons may be displayed together with the input image 300 on the monitor 11, to allow the user to enter such input commands.

Upon receipt of a user input initiating encryption, the encryption area designation unit 120 triggers encryption of two designated areas 310 and 320 in the order that they are specified. Alternatively, the encryption area designation unit 120 triggers encryption of those designated areas 310 and 320 in ascending order of their coordinate values (e.g., y-axis values) within the input image 300. When the first-specified area is finished, the encryption area designation unit 120 subjects the next designated area to encryption processing. Suppose, for example, that the user has specified one designated area 310 in the first place. The encryption area designation unit 120 encrypts the designated area 310 and places markers therefor, thus producing an encrypted area 310a. The encryption area designation unit 120 then proceeds to the other designated area 320 and similarly initiates encryption and marker placement, thus producing another encrypted area 320a. Two encrypted areas 310a and 320a are produced in this way, by subjecting every designated area 310 and 320 to the encryption process. The resulting image, including encrypted areas 310a and 320a, is referred to as an encrypted image 300a.

The above description has exemplified the case of two designated areas. The same description may similarly apply to the cases in which there are three or more designated areas.

Figure 7A:
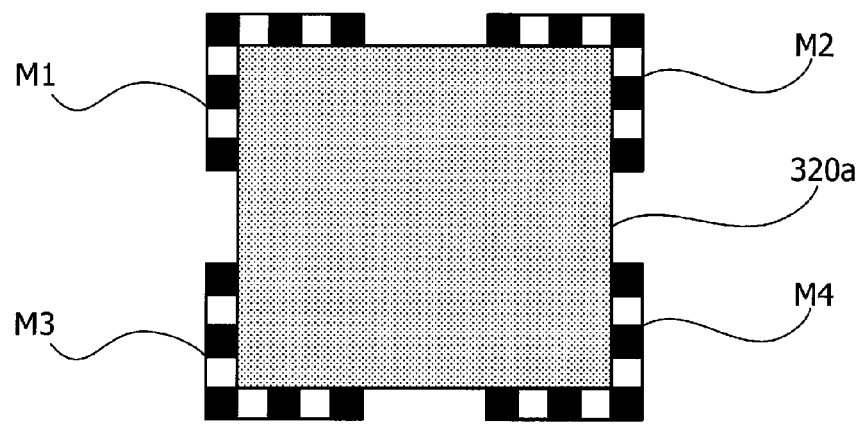
FIGS. 7A and 7B illustrate markers and search areas.
Figure 7B:
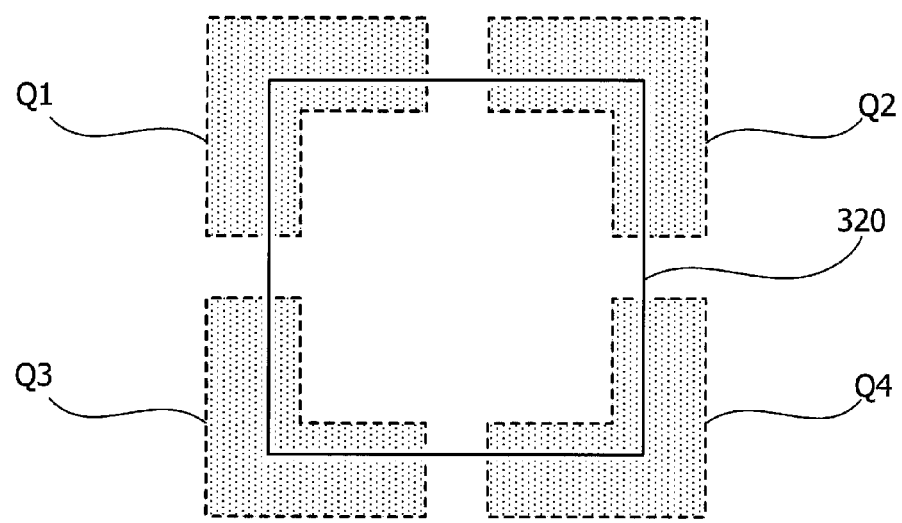

FIGS. 7A and 7B illustrate markers and search areas. FIG. 7A illustrates the shape and pixel pattern of markers, while FIG. 7B illustrates search areas corresponding to the markers.

Specifically, markers M1, M2, M3, and M4 are placed at four corners of an encrypted area 320a, each having an L-shaped figure with a specific pixel pattern. The pixel pattern may be composed as, for example, a repetitive series of white and black pixel blocks each constituted by one or more pixels. While the following description assumes that marker patterns are each composed of white and black blocks, the embodiments should not be limited by this specific setup, and other patterns may also be applicable as long as they distinguish from each other. For example, some marker patterns may use some distinguishable color components such as red and blue. In the illustrated pattern of FIGS. 7A and 7B, white blocks and black blocks are concatenated alternately. Variations of this pattern may take other arrangements such as white-white-black-white-white-black, or white-black-black-white-black-black. Marker patterns may also vary in size and proportion. For example, the ratio of horizontal and vertical lengths may be set to 7:7 or 5:7 or any other values, as opposed to the 5-by-5 L-shaped pattern illustrated in FIGS. 7A and 7B.

The image processing apparatus 200 can identify the boundaries of the encrypted area 320a by detecting markers M1, M2, M3, and M4.

Search areas Q1, Q2, Q3, and Q4 are where markers M1, M2, M3, M4 may be placed in relation to a designated area 320. The control data storage unit 110 stores control data that defines such search areas Q1, Q2, Q3, and Q4 containing four corners of the designated area 320. This definition may actually depend on the shape of markers M1, M2, M3, and M4.

The following description assumes that the image processing apparatus 200 places the above-described markers M1, M2, M3, and M4. The image processing apparatus 200 may, however, place markers having other shape, as will be described later.

Figure 8:
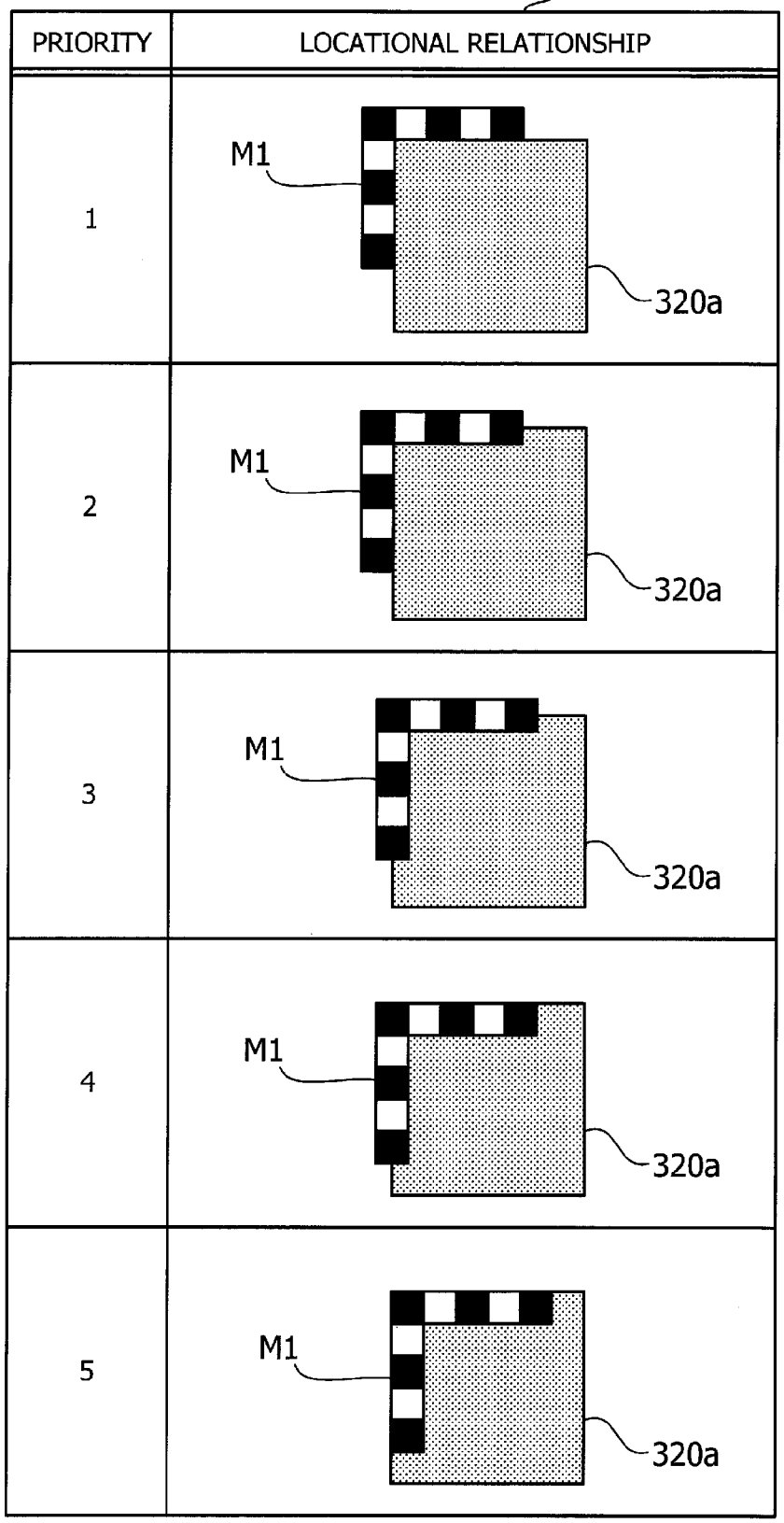
FIG. 8 illustrates an exemplary data structure of a priority table.

FIG. 8 illustrates an exemplary data structure of a priority table, which is previously defined and stored in the control data storage unit 110 and decryption control data storage unit 210. The illustrated priority table 111 has two data fields respectively indicating priority and locational relationship. The data values horizontally arranged in this table are associated with each other to constitute a specific priority condition.

The priority field contains information indicating a specific priority level. For example, smaller priority values mean higher priority levels. The locational relationship field indicates a locational relationship between a marker and an encryption area. The terms "upper," "lower," "right," and "left" will be used to represent the upward, downward, rightward, and leftward directions as viewed in FIG. 8. A lower number in FIG. 8 means higher priority.

For example, the priority table 111 contains a priority of "1" and its associated locational condition, which says: marker M1 is located at the upper-left corner of an encrypted area 320a without gaps. The priority table 111 of FIG. 8 represents this condition in a graphical fashion (the same applies to the rest).

Another record of the priority table 111 contains a priority of "2" and its associated locational condition, which says: marker M1 is located half a block lower than the marker position of priority "1" described above.

Yet another record of the priority table 111 contains a priority of "3" and its associated locational condition, which says: marker M1 is located half a block to the right of the marker position of priority "2" described above.

Still another record of the priority table 111 contains a priority of "4" and its associated locational condition, which says: marker M1 is located half a block lower than the marker position of priority "3" described above.

Still another record of the priority table 111 contains a priority of "5" and its associated locational condition, which says: marker M1 is located half a block to the right of the marker position of priority "4" described above.

The collection of such potential locations of marker M1 defined in the priority table 111 gives what has been discussed as a search area Q1 in FIGS. 7A and 7B.

The above-described priority table 111 exemplifies one marker M1. Priorities of other markers M2, M3, and M4 are also defined in a similar way, but depending on their locations relative to the encrypted area 320a.

For example, a priority of "1" is given to the location of markers M2, M3, and M4 when it is a corner of the encrypted area 320a without gaps. A priority of "2" is given to the marker location that is vertically away from the marker position of priority "1" described above, half a block toward the inside of the encrypted area 320a. A priority of "3" is given to the marker location that is horizontally away from the marker position of priority "2" described above, half a block toward the inside of the encrypted area 320a. A priority of "4" is given to the marker location that is vertically away from the marker position of priority "3" described above, half a block toward the inside of the encrypted area 320a. A priority of is given to the marker location that is horizontally away from the marker position of priority "4" described above, half a block toward the inside of the encrypted area 320a.

As can be seen from the above example, the priority table 111 defines priority of each possible location of markers. Specifically, a higher priority is given to marker locations as they have less overlap with the encrypted area 320a.

The locational relationship field of the priority table 111 may actually contain, for example, relative coordinates of a reference point of a marker with respect to that of the encrypted area 320a. More specifically, a marker is composed of two bars respectively extending in the horizontal and vertical directions. The reference point of the marker may be defined to be a pixel at the intersection of these two bars, and more particularly, the reference-point pixel may be the most inward one of the pixels constituting the intersecting block. The encrypted area 320a, on the other hand, may have its reference point at a pixel of the corner closest to the marker in question. For example, when the marker has a line width of four pixels, the relative coordinates of priority "1" in FIG. 8 are expressed as (1, 1). Similarly the relative coordinates of priority "3" and priority "5" in FIG. 8 are expressed as (3, 3) and (5, 5), respectively.

The above example of locational relationships assumes that markers are placed with a half-block resolution. Other possible resolutions include one third block, one fourth block, and other finer fractions. The use of finer units of resolution reduces the amount of overlap of each marker with the encrypted area 320a.

According to the above-described locational relationships, the highest priority "1" is given to the case where the marker M1 and encrypted area 320a are next to each other. It is also possible, however, to define more locational relationships with a higher priority. For example, marker M1 may move from its priority-1 location by some pixels in the upper-left direction, away from the encrypted area 320a, and a higher priority is then given to the marker M1 in that new position. The marker M1 at this position is apart from the encrypted area 320a, thus preventing their boundaries from becoming obscure when they are printed.

The above-described information in the priority table 111 is applied to one search area Q1. A priority table is similarly defined for each of the other search areas Q2, Q3, and Q4.

The next section of this description provides details of processing operation that the above image processing apparatuses 100 and 200 execute. To start with, an encryption process of the image processing apparatus 100 will now be described below.

Figure 9:
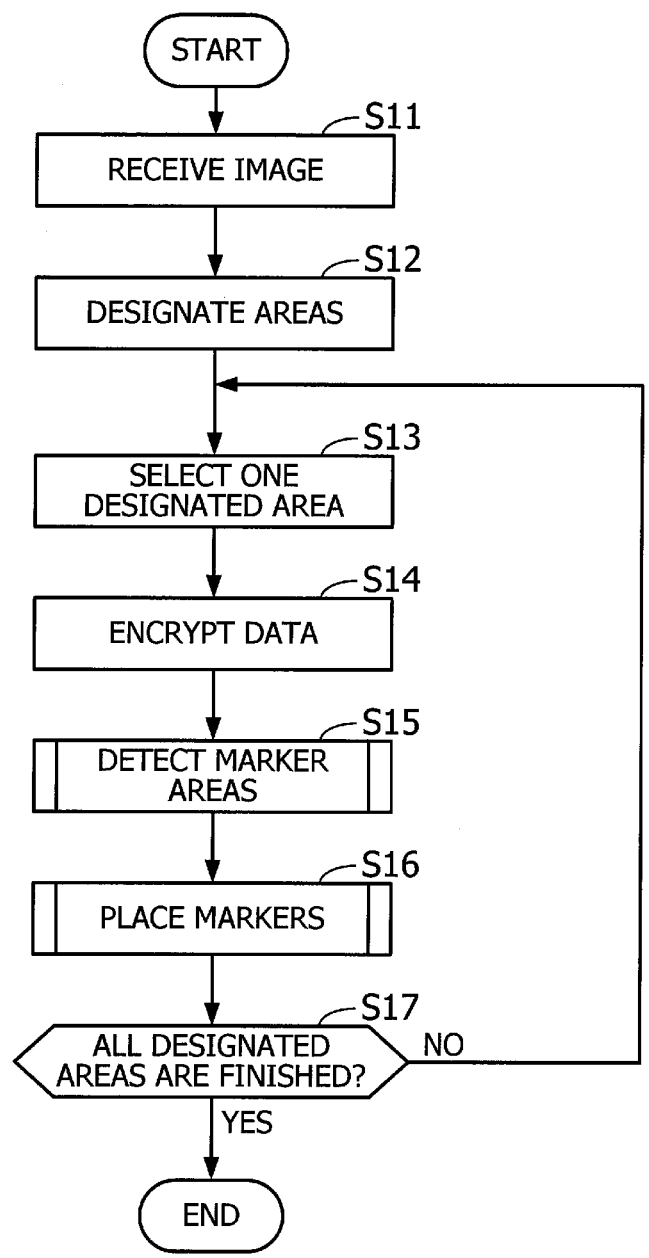
FIG. 9 is a flowchart illustrating an encryption process according to the second embodiment.

FIG. 9 is a flowchart illustrating an encryption process according to the second embodiment. Each step of this process is described below in the order of step numbers.

(Step S11) The encryption area designation unit 120 receives an input image 300.

(Step S12) The encryption area designation unit 120 permits the user to designate a specific area(s) in the input image 300. It is assumed now that the user has designated two or more areas.

(Step S13) The encryption area designation unit 120 selects one of the designated areas. For example, the encryption area designation unit 120 may select these areas in the order that the user has designated.

Alternatively, the encryption area designation unit 120 may select the areas in ascending order of their coordinates (e.g., y coordinates) within the input image 300. Suppose, for example, that there are two designated areas 310 and 320. The encryption area designation unit 120 selects the former area 310 in the first place and informs the encryption unit 130 and marker area detection unit 140 of the selected area.

(Step S14) The encryption unit 130 encrypts the designated area that is informed of by the encryption area designation unit 120. The encryption unit 130 produces and stores control data in the control data storage unit 110 to record which part of the input image 300 is encrypted. For example, this control data may record the corner points of the encrypted area.

(Step S15) The marker area detection unit 140 obtains search areas Q1, Q2, Q3, and Q4 relevant to the designated area informed of by the encryption area designation unit 120, by consulting the control data stored in the control data storage unit 110. Out of these search areas Q1, Q2, Q3, and Q4, the marker area detection unit 140 detects appropriate marker areas by excluding coordinate points that overlap with other encrypted areas or their markers. The marker area detection unit 140 provides the marking unit 150 with the detected marker areas.

(Step S16) With reference to a relevant priority table 111 stored in the control data storage unit 110, the marking unit 150 places a marker at the highest-priority position in each marker area so as to indicate the encrypted area in the input image 300. The marking unit 150 adds control data to the control data storage unit 110 to record the marked area (e.g., record each corner positions of the area).

(Step S17) The marking unit 150 determines whether there is any pending designated area in the input image 300. If there is, the marking unit 150 moves the process back to step S13. If all the designated areas are finished, the marking unit 150 outputs the resulting encrypted image 300a, thus terminating the present process.

As can be seen from the above steps, the image processing apparatus 100 encrypts data locally in each designated area. Markers are then placed at each resulting data area (encrypted area) for the purpose of demarcation.

The above procedure executes encryption at step S14. Alternatively, the procedure may be modified to perform the same immediately before the marker placement of step S16.

The above step S15 will now be described in detail below.

Figure 10:
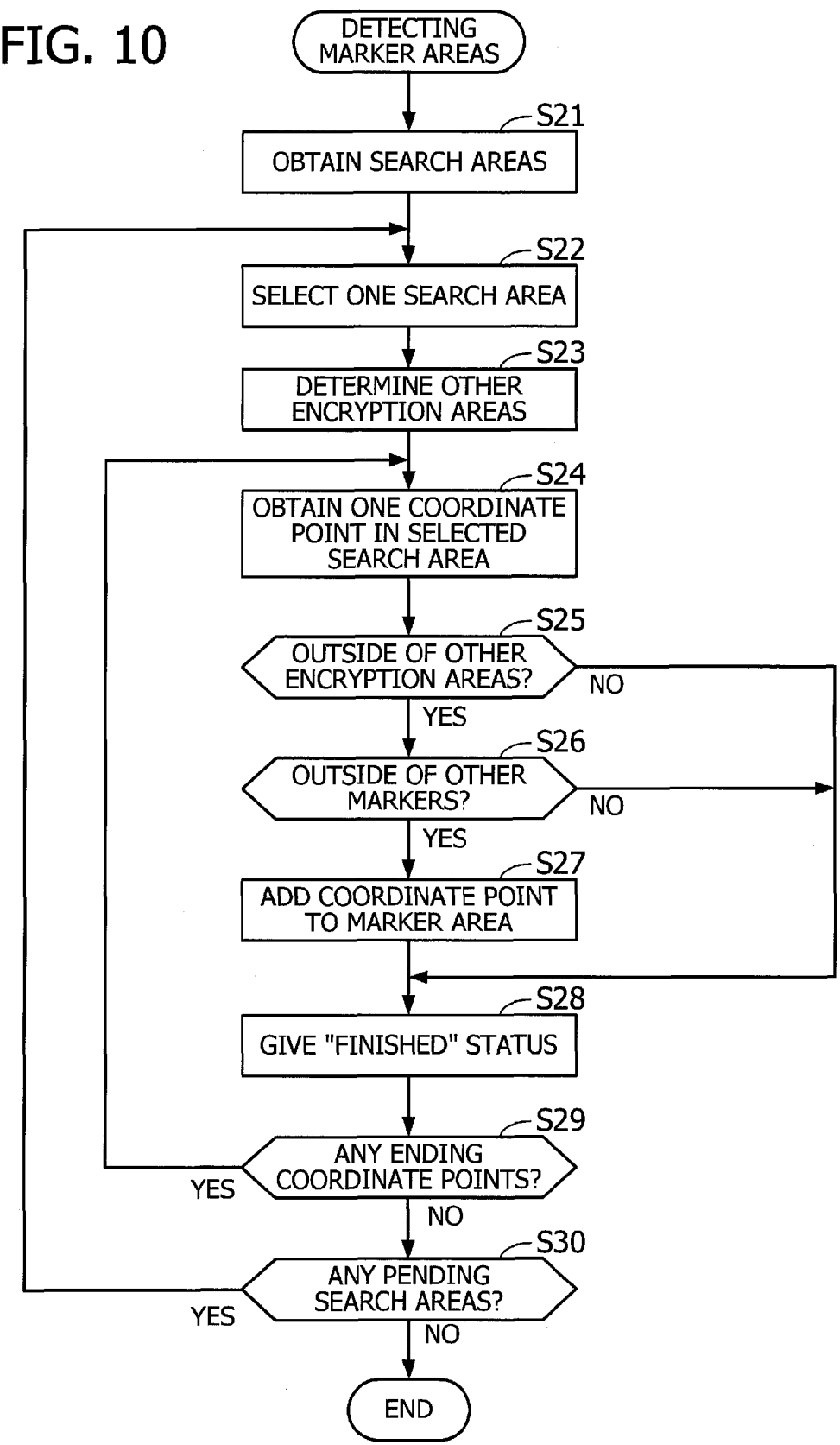
FIG. 10 is a flowchart illustrating how marker areas are detected according to the second embodiment.

FIG. 10 is a flowchart illustrating how marker areas are detected according to the second embodiment. Each step of this process is described below in the order of step numbers.

(Step S21) With reference to control data stored in the control data storage unit 110, the marker area detection unit 140 obtains search areas Q1, Q2, Q3, and Q4 relevant to the designated area informed of by the encryption area designation unit 120.

(Step S22) The marker area detection unit 140 selects one of the search areas Q1, Q2, Q3, and Q4. Suppose, for example, that search area Q1 is selected.

(Step S23) The marker area detection unit 140 identifies other encrypted areas and their marker positions. More specifically, the marker area detection unit 140 searches the control data stored in the control data storage unit 110 to retrieve coordinate values representing the corner points of existing encrypted areas and existing marker areas.

(Step S24) The marker area detection unit 140 takes one pixel contained in the selected search area and obtains a coordinate point P of that pixel.

(Step S25) The marker area detection unit 140 determines whether the obtained coordinate point P lies outside of the other encrypted areas. When P lies outside, the marker area detection unit 140 advances the process to step S26. When P lies inside, the marker area detection unit 140 advances the process to step S28.

The above test of whether the coordinate point P lies outside of another encrypted area (e.g., an area represented as a quadrangle ABCD) can be realized by calculating the following exterior products of vectors:

$$\vec{AP} \times \vec{AB} \quad (1)$$

$$\vec{BP} \times \vec{BC} \quad (2)$$

$$\vec{CP} \times \vec{CD} \quad (3)$$

$$\vec{DP} \times \vec{DA} \quad (4)$$

where A, B, C, and D represent the coordinates of four corner points of a quadrangle ABCD. When all the four products (1) to (4) are greater than or equal to zero, or when all of them are smaller than or equal to zero, the coordinate point P is determined to be inside the quadrangle ABCD, including the case where P is right on the periphery. It is noted that the above processing applies not only to rectangular areas, but also to other polygons.

(Step S26) The marker area detection unit 140 determines whether the coordinate point P lies outside the markers of other encrypted areas. When P lies outside, the marker area detection unit 140 advances the process to step S27. When P lies inside, the marker area detection unit 140 advances the process to step S28.

The test of whether the coordinate point P are outside or inside markers is performed with the same method discussed above in step S25.

(Step S27) The marker area detection unit 140 adds the coordinate point P to the marker area.

(Step S28) The marker area detection unit 140 gives a "finished" status to the coordinate point P, which are among those contained in the selected search area.

(Step S29) The marker area detection unit 140 determines whether the selected search area still contains pending coordinate points. When a pending coordinate point is found, the marker area detection unit 140 goes back to step S24. When no pending coordinate points are found, the marker area detection unit 140 outputs the resulting marker area to the marking unit 150, thus advancing the process to step S30. For example, the marker area detection unit 140 outputs information indicating a marker area R1 for the search area Q1.

(Step S30) The marker area detection unit 140 determines whether the search areas Q1, Q2, Q3, and Q4 include any other pending search areas that have not undergone the above search. When there are pending search areas, the marker area detection unit 140 goes back to step S22. When all the search areas have undergone the above search, the marker area detection unit 140 terminates the process.

As can be seen from the above description, the marker area detection unit 140 scans each search area Q1, Q2, Q3, and Q4 to extract coordinate points that do not overlap with other encrypted areas or their markers. The resulting set of coordinate points forms a marker area.

Figure 11A:
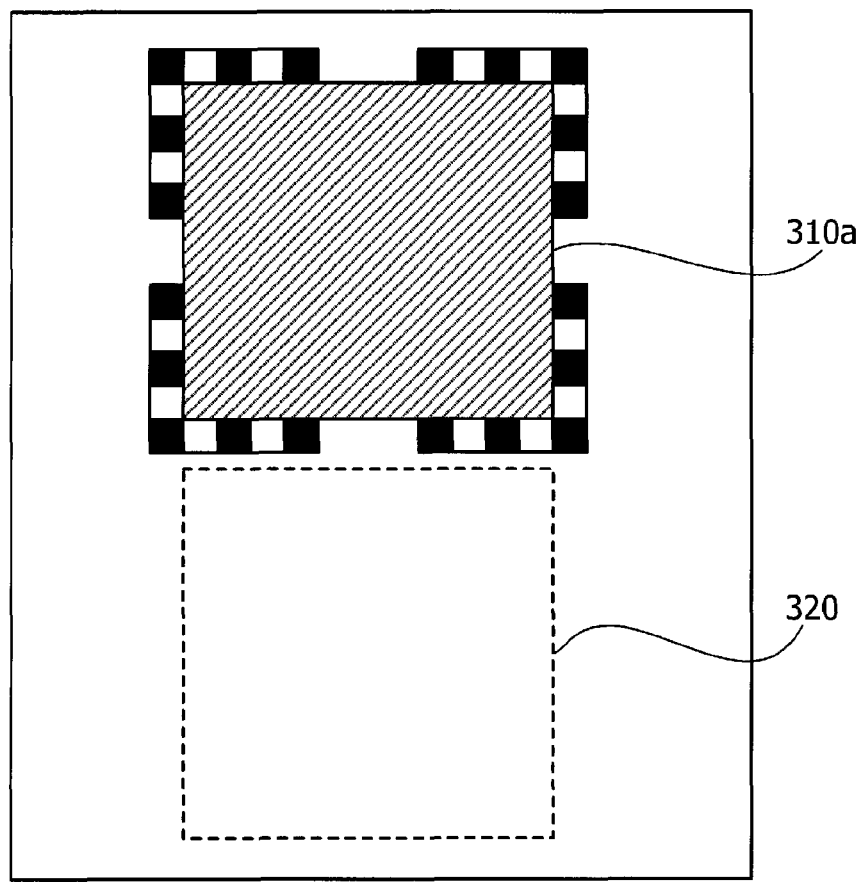
FIGS. 11A and 11B illustrate a specific example of the process of detecting marker areas according to the second embodiment.
Figure 11B:
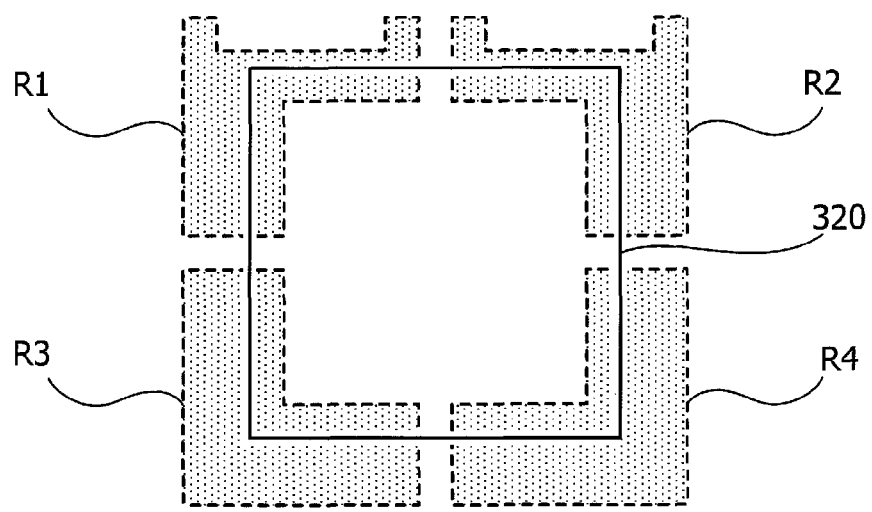

FIGS. 11A and 11B illustrate a specific example of the process of detecting marker areas according to the second embodiment. FIG. 11A illustrates an exemplary arrangement of an encrypted area 310a, its associated markers, and a designated area 320. FIG. 11B depicts exemplary marker areas that marker area detection unit 140 detects under the arrangement of FIG. 11A. It is noted here that one designated area 310 has been encrypted before another designated area 320, and thus there exists an encrypted area 310a.

When the encrypted area 310a is close to the designated area 320, the encrypted area 310a and its markers may partly overlap with search areas Q1, Q2, Q3, and Q4. If this is the case, the marker area detection unit 140 collects appropriate coordinate points in each search area Q1, Q2, Q3, and Q4 which do not overlap with the encrypted area 310a or its associated markers. The resulting sets of coordinate points constitute marker areas R1, R2, R3, and R4. Referring to the example of FIGS. 11A and 11B, the first two marker areas R1 and R2 are created from the search areas Q1 and Q2 in FIGS. 7A and 7B by removing their respective overlaps with some markers for the encrypted area 310a. The marking unit 150 uses such marker areas R1, R2, R3, and R4 to select appropriate places for markers M1, M2, M3, and M4, not to make them overlap with the encrypted area 310a and its associated markers.

The foregoing step S16 of FIG. 9 will now be described in detail below.

Figure 12:
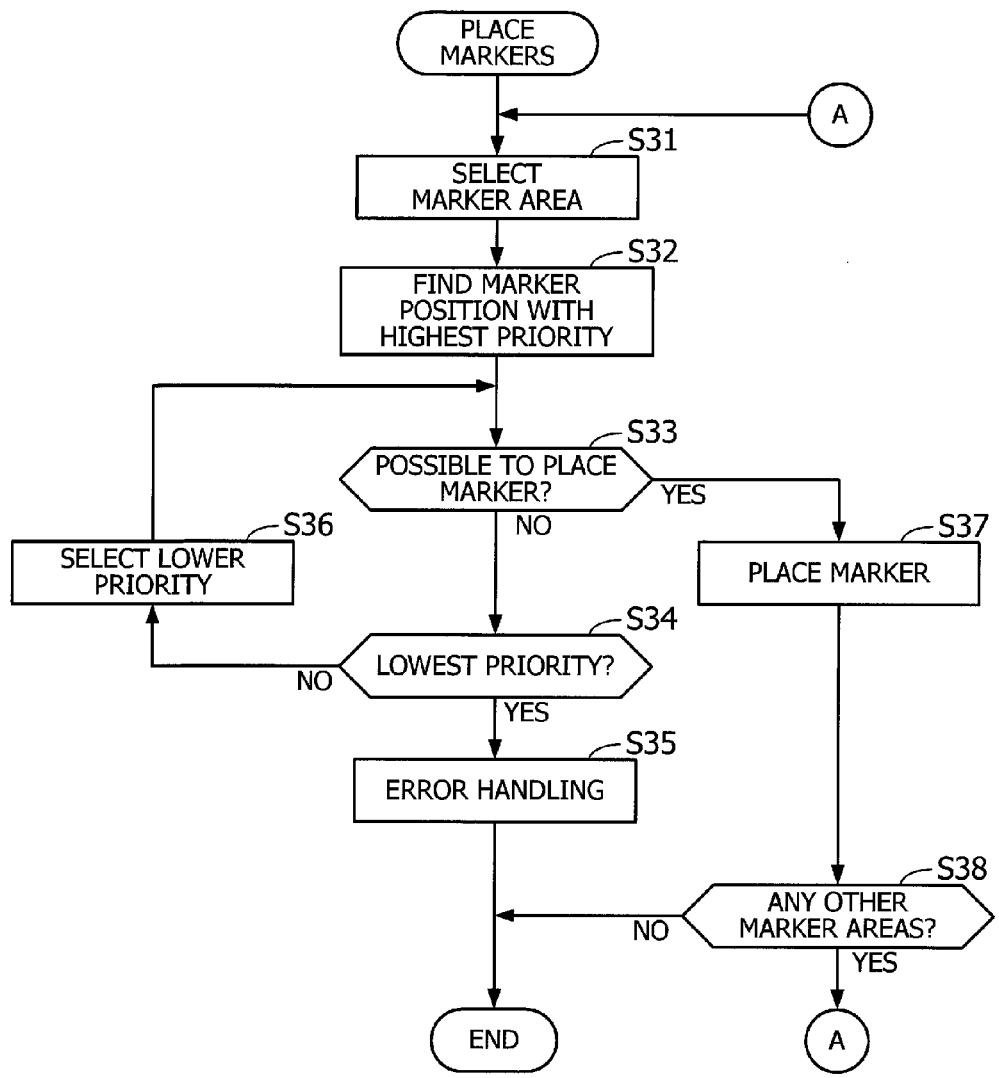
FIG. 12 is a flowchart illustrating how markers are placed according to the second embodiment.

FIG. 12 is a flowchart illustrating how markers are placed according to the second embodiment. Each step of this process is described below in the order of step numbers.

(Step S31) The marking unit 150 selects a marker area. Specifically, the marking unit 150 selects one of the marker areas R1, R2, R3, and R4 detected by the marker area detection unit 140. Suppose, for example, that one marker area R1 is selected.

(Step S32) The marking unit 150 consults a relevant priority table 111 in the control data storage unit 110 to find a marker position with the highest priority. Specifically, this marker position has a priority of "1" in the priority table 111. As mentioned previously, the priority of marker positions is defined separately for each search area Q1, Q2, Q3, and Q4. In the case of marker area R1, the marking unit 150 consults the foregoing priority table 111 since this table contains information about search area Q1 corresponding to the marker area R1 in question.

(Step S33) The marking unit 150 tries to place a marker in the selected marker area. That is, the marking unit 150 determines whether it is possible to place a marker at the marker position with the current priority. If a marker is not placeable, the marking unit 150 advances the process to step S34. If it is placeable, the marking unit 150 advances the process to step S37.

More specifically, the word "placeable" is used to mean that the marker area can contain a marker in its entirety. When the marker extends off the marker area, it is not placeable. Referring to, for example, the marker area R1 detected as in FIG. 11B, it is not possible to place a marker M1 at the position with a priority of "1" in FIG. 8. The same marker area R1 can, however, accommodate a marker M1 when it is placed at the position with a priority of "2" in FIG. 8. As to another marker area R3 seen in FIG. 11B, a marker M3 is placeable in that area even at the position of priority "1."

(Step S34) With reference again to the priority table 111, the marking unit 150 determines whether there is a priority lower than the currently selected one. When no lower priority is found, the marking unit 150 advances the process to step S35. When there is a lower priority, the marking unit 150 advances the process to step S36.

(Step S35) The marking unit 150 invokes an error handling routine. For example, the marking unit 150 causes a message to appear on the monitor 11 to inform the user that markers are not placeable. The process of FIG. 12 is thus terminated.

(Step S36) From among those in the priority table 111, the marking unit 150 selects a new priority that is lower than the currently selected one. For example, the marking unit 150 selects priority "2" when the current priority is "1" and then advances the process to step S33.

(Step S37) The marking unit 150 places a marker at the position corresponding to the current priority. The marking unit 150 gives a "finished" status to the currently selected marker area.

When placing a marker, the marking unit 150 does some additional work to indicate which priority was used for that marker. This is for the purpose of later distinction when the image is read. For example, the marking unit 150 may add a reference marker(s) at some specific point(s) in relation to the newly placed marker. A specific example will be discussed in a later section.

(Step S38) The marking unit 150 determines whether there are any other pending marker areas. When a pending marker area is found, the marking unit 150 goes back to step S31. When all marker areas are finished, it means the end of the process of FIG. 12. Marker areas may be selected in any desired order. For example, the marking unit 150 selects four marker areas R1, R2, R3, and R4 in that order.

The above-described steps permit the marking unit 150 to find an appropriate marker position with as high a priority as possible, so that a maker M1 can be placed within a marker area R1. It is therefore possible to add markers to a new encryption area without overlap with exiting encrypted areas and their associated markers, as well as minimizing the amount of overlap with the new encryption area.

The next section will describe a more specific example of marker placement performed by the marking unit 150 at step S37. Described in the first place is a marker placement method that enables readout of data together with information indicating the priority of marker positions.

Figure 13A:
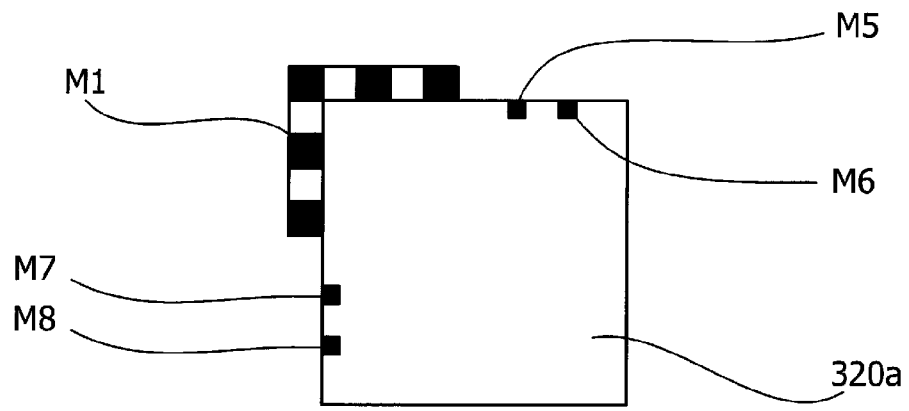
FIGS. 13A and 13B illustrate how reference markers are added.
Figure 13B:
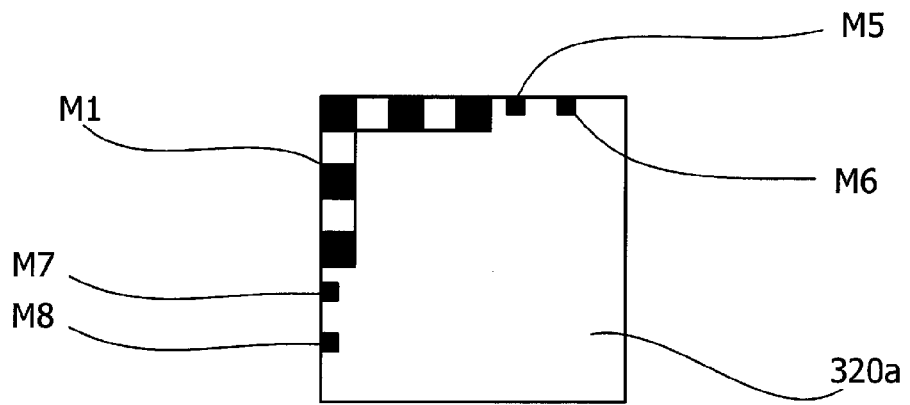

FIGS. 13A and 13B illustrate how reference markers are added. Here the marking unit 150 adds reference markers M5, M6, M7, and M8 in relation to a marker M1. FIG. 13A illustrates the case of priority "1," while FIG. 13B illustrates the case of priority "5."

Specifically, the marking unit 150 sets a reference point at the position that is horizontally away from one corner (e.g., upper-left corner in FIGS. 13A and 13B) of an encrypted area 320a by a predetermined distance in the direction toward inside of the encrypted area 320a (in the rightward direction in FIGS. 13A and 13B). Then the marking unit 150 adds two reference markers M5 and M6 in such a way that one of them (e.g., reference marker M5) will be right on the reference point.

The marking unit 150 sets another reference point at the position that is vertically away from the corner of the encrypted area 320a (e.g., upper-left corner in FIGS. 13A and 13B) by a predetermined distance in the direction toward inside of the encrypted area 320a (in the downward direction in FIGS. 13A and 13B). Then the marking unit 150 adds another two reference markers M7 and M8 in such a way that one of them (e.g., reference marker M7) will be right on the reference point.

In the way described above, the marking unit 150 puts reference markers M5, M6, M7, and M8 at predetermined places in the encrypted area 320a. While FIGS. 13A and 13B illustrate black dots as an example, the reference markers M5, M6, M7, and M8 may take other form such as white dots. As another implementation, some pixels inside the encrypted area 320a may be reversed or shifted to constitute reference markers. A reading device locates the marker M1 and reference markers M5, M6, M7, and M8 when capturing the image. Here the locational relationships between the marker M1 and reference markers M5, M6, M7, and M8 indicate which priority was used to position the marker M1.

For example, the image processing apparatus 200 scans a plurality of rows on a given encrypted image 300a, including those of markers M1, thereby detecting reference markers M5 and M6. One of these reference markers M5 and M6 sits on the reference point. It is the former reference marker M5 in the present case. The image processing apparatus 200 then evaluates the locational relationship (or distance) between the reference marker M5 and marker M1 in the vertical or horizontal direction. Likewise, the image processing apparatus 200 also scans a plurality of columns on the encrypted image 300a, including those of markers M1, thereby detecting another two reference markers M7 and M8. One of these reference markers M7 and M8 sits on the reference point. It is the former reference marker M7 in the present case. The image processing apparatus 200 then evaluates a locational relationship (or distance) between the reference marker M7 and marker M1 in the vertical or horizontal direction. In this way, the image processing apparatus 200 detects locational relationships between the marker M1 and each reference marker.

The priority of marker M1 is associated with the marker's locational relationships with reference markers M5, M6, M7, and M8. This association between the priority and locational relationships is previously agreed upon by the two image processing apparatuses 100 and 200 and stored as part of the decryption control data in the decryption control data storage unit 210. Reference markers M5, M6, M7, and M8 have specific colors, spaces, and indication of a reference point. This arrangement pattern of reference markers is previously defined and stored as part of control data in the control data storage unit 110, also as decryption control data in the decryption control data storage unit 210.

With reference to such control data, the image processing apparatus 200 identifies which priority the image processing apparatus 100 used to place the marker M1 in question, based on its location relative to the reference markers M5, M6, M7, and M8.

In the above example, each marker has a plurality of reference markers. The embodiments are, however, not limited by that specific example. Alternatively, reference markers may be placed at the middle point of each edge of an encrypted area 320a, so that two markers at adjacent corners share their reference markers. For example, reference markers M5 and M6 may be configured to serve two markers M1 and M2, so that these reference markers can also be used to identify the priority of marker M2. Similarly, reference markers M7 and M8 may be configured to serve two markers M1 and M3, so that these reference markers can also be used to identify the priority of marker M3.

In the above example, two pairs of reference markers are provided for one marker, one pair being horizontally aligned with the marker, the other pair being vertically aligned with the marker. The embodiments are, again, not limited by that specific implementation. For example, three or more reference markers may be placed in each of the horizontal and vertical directions.

It would also be possible to vary the pixel pattern of new markers in accordance with their respective priorities, so that the priority of a marker can be recognized from its pixel pattern. The following section describes this variation of the embodiment.

Figure 14A:
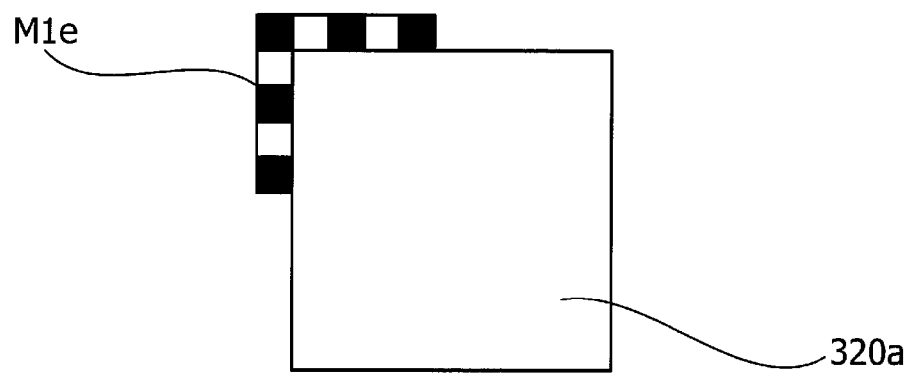
FIGS. 14A and 14B give another example of how reference markers are added.
Figure 14B:
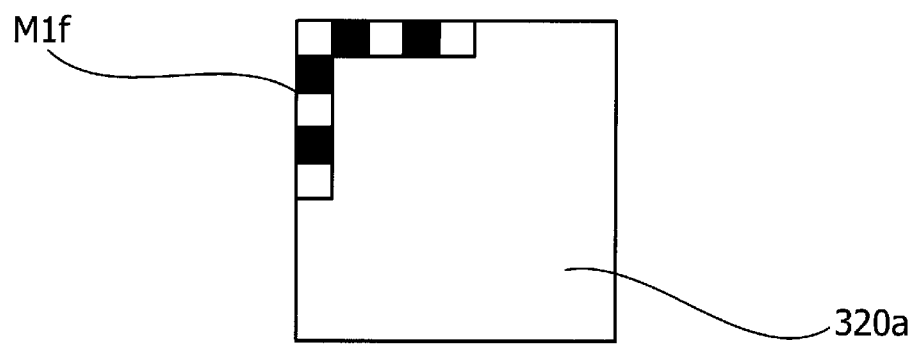

FIGS. 14A and 14B give another example of how reference markers are added. The marking unit 150 changes the pixel pattern of each block constituting markers, depending on their priorities. Such pixel patterns of markers substantially indicate relative positions of the markers with respect to their associated encrypted area. FIG. 14A illustrates the case of priority "1," while FIG. 14B illustrates the case of priority "5."

Variations of pixel pattern may be achieved by, for example, changing the order of white blocks and black blocks. Another example is to vary the intervals of alternating white and black blocks. In the example of FIGS. 14A and 14B, the pixel pattern of marker M1f at the priority-5 position is in reverse order to that of marker M1e at the priority-1 position.

The association between pixel pattern and priority is previously agreed upon by the two image processing apparatuses 100 and 200 and stored as part of control data in the control data storage unit 110. The association is also stored as part of decryption control data in the decryption control data storage unit 210.

Such control data permits the image processing apparatus 200 to identify which priority the image processing apparatus 100 used to place the marker M1.

The information indicating priority may be embedded at a position that overlaps with markers, or at a position that does not overlap with markers. The pixel pattern of reference markers illustrated in FIGS. 13A and 13B may be changed depending on the priority, so that the priority of marker M1 can be identified at the decoding end.

A more specific example of marker placement will now be explained below.

Figure 15A:
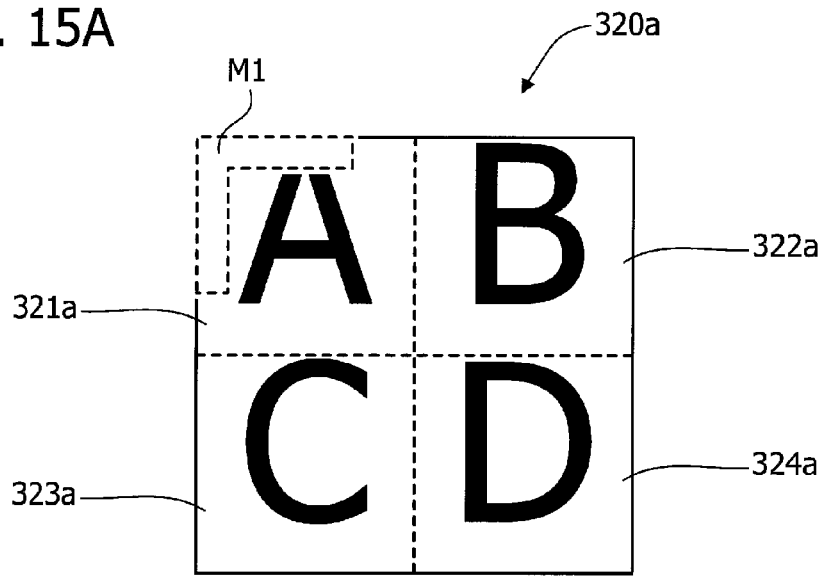
FIGS. 15A and 15B are first diagrams illustrating how markers are placed according to the second embodiment.
Figure 15B:
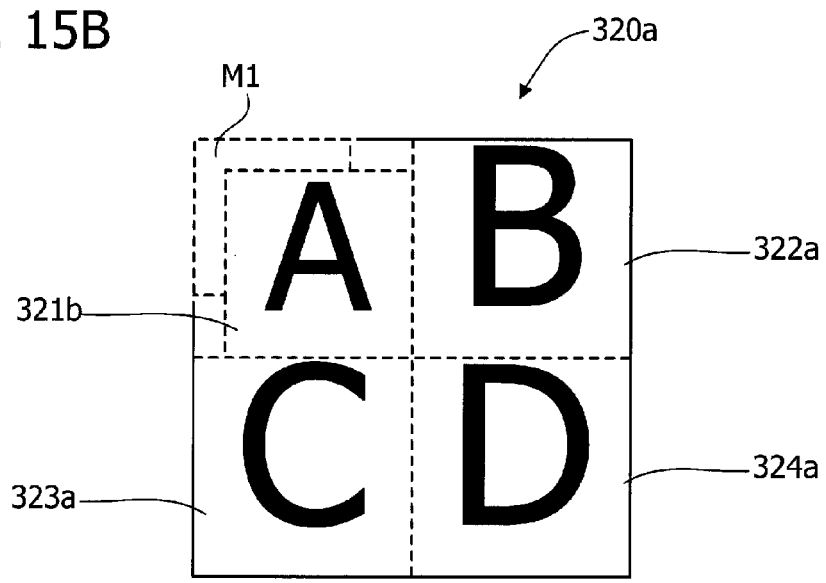

FIGS. 15A and 15B are first diagrams illustrating how markers are placed according to the second embodiment. FIG. 15A illustrates a marker M1 overlapping with its associated encrypted area 320a. FIG. 15B, on the other hand, illustrates the case where the image processing apparatus 100 places a marker M1 after shrinking an area 321a to avoid their overlap.

More specifically, FIG. 15A illustrates the case where the image processing apparatus 100 has performed a process of encryption and marker placement in the way described below. First, at step S37 of FIG. 12, the marking unit 150 places a marker in an area where the marker partly overlaps with an encryption area. This overlap causes a partial loss of data in the encryption area.

The image processing apparatus 200 reads out image data in the encrypted area 320a while recovering information in the above-noted overlap with the marker M1 by using interpolation or extrapolation techniques. The image processing apparatus 200 decrypts the encrypted area 320a based on its recovered image data.

There is an alternative method to deal with such overlap of an encrypted area 320a and markers. That is, markers may be placed in the way illustrated in FIG. 15B.

At step S37 of FIG. 12, the marking unit 150 divides the encrypted area 320a into four areas 321a, 322a, 323a, and 324a and scales down one area 321a since it partly overlaps with marker. Before a marker M1 is placed, the shrunken image of the area 321a is moved to another area 321b that has no overlap with the marker M1. The shrink ratio may be determined according to the priority. For example, the shrink ratio is determined such that one corner of the shrunken area 321b will be immediately adjacent to its opposite corner of the marker M1.

While alphabets A, B, C, and D are seen in the areas 321a, 321b, 322a, 323a, and 324a of FIGS. 15A and 15B, these letters are used only for the purpose of making these areas distinguishable.

The image processing apparatus 200 reads the image seen in FIG. 15B. Here the image processing apparatus 200 expands the shrunken area 321b back to its original size, i.e., that of the area 321a, during the course of image reading. The expansion ratio can be determined by identifying the priority that was used. The image processing apparatus 200 then decrypts the encrypted area 320a from the resized image data.

The next section of this description will give a specific example of how markers are placed when two encrypted areas 310a and 320a are closely located.

Figure 16A:
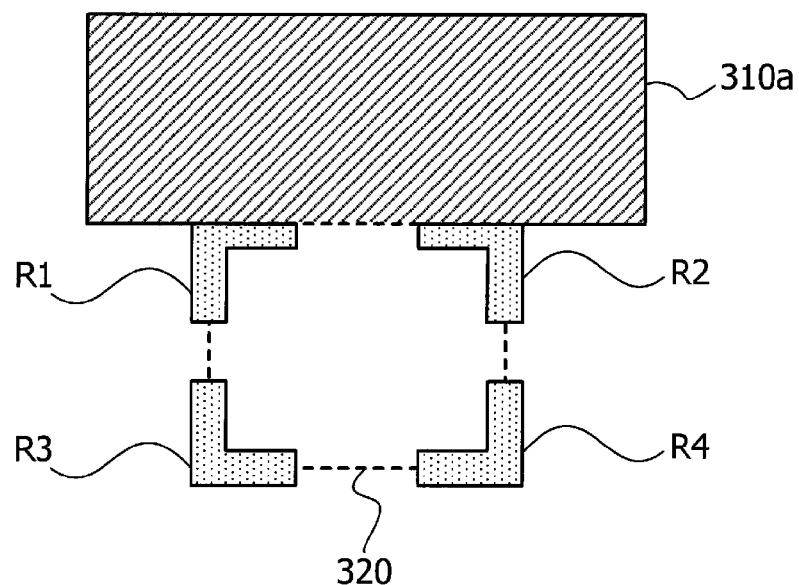
FIGS. 16A and 16B are second diagrams illustrating how markers are placed according to the second embodiment.
Figure 16B:
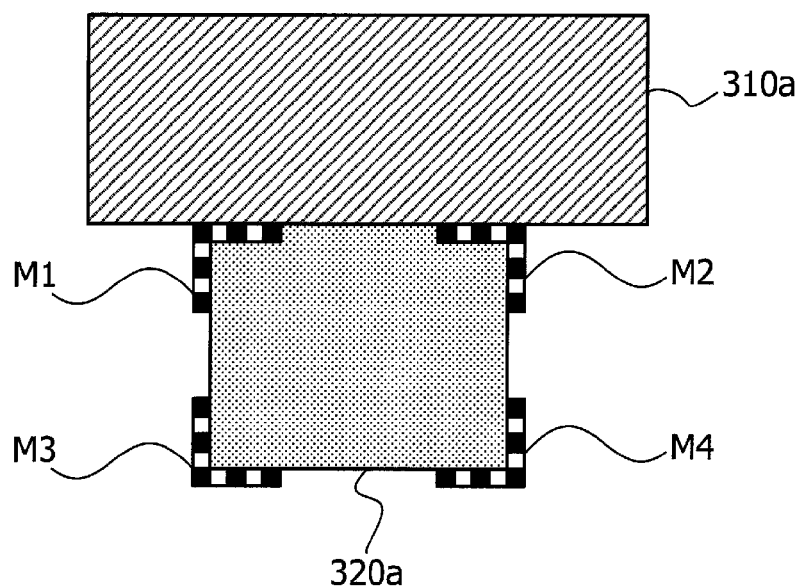

FIGS. 16A and 16B are second diagrams illustrating how markers are placed according to the second embodiment. FIG. 16A illustrates marker areas R1, R2, R3, and R4 in the case where a designated area 320 is located on an encrypted area 310a. FIG. 16B illustrates markers M1, M2, M3, and M4 placed in the respective marker areas R1, R2, R3, and R4.

The marker area detection unit 140 detects marker areas R1, R2, R3, and R4 within search areas Q1, Q2, Q3, and Q4 by removing their overlap with the encrypted area 310a. In the example seen in FIG. 16A, overlaps of search areas Q1 and Q2 with the encrypted area 310a have been removed to produce marker areas R1 and R2. In contrast, search areas Q3 and Q4 have no overlap with other encrypted areas. The resulting marker areas R3 and R4 therefore coincide with the search areas Q3 and Q4.

The encryption unit 130 encrypts data in the designated area 320, thus producing an encrypted area 320a.

The marking unit 150 places markers M1, M2, M3, and M4 at the highest-priority positions in the respective marker areas R1, R2, R3, and R4 attached to the encrypted area 320a.

As can be seen from the above description, the image processing apparatus 100 places markers M1 and M2 at appropriate positions along the boundary of an encrypted area 320a even though the encrypted area 320a is immediately adjacent to another encrypted area 310a.

Figure 17A:
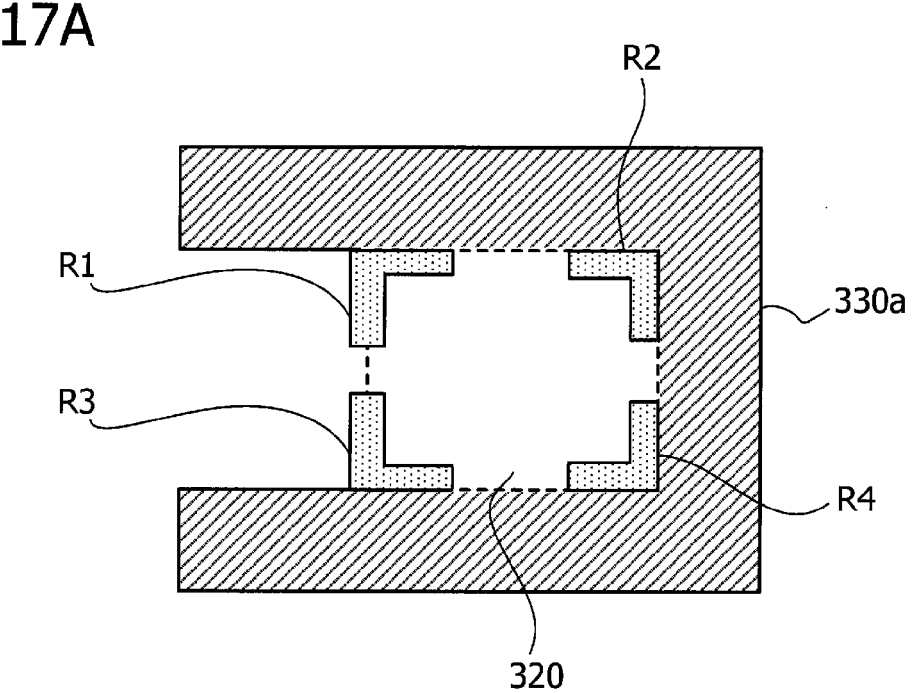
FIGS. 17A and 17B are third diagrams illustrating how markers are placed according to the second embodiment.
Figure 17B:
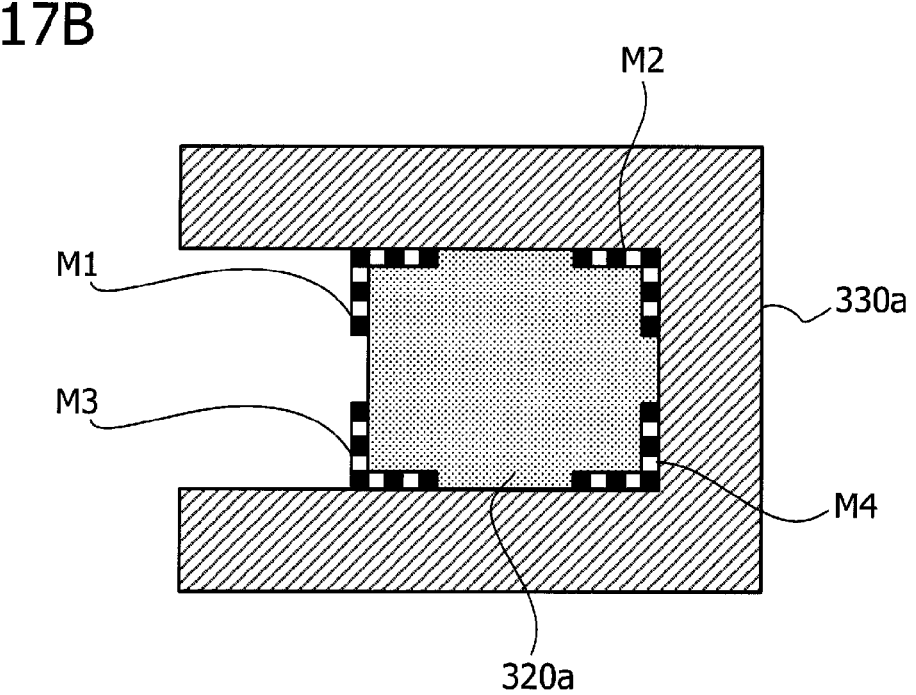

FIGS. 17A and 17B are third diagrams illustrating how markers are placed according to the second embodiment. FIG. 17A illustrates marker areas R1, R2, R3, and R4 in the case where a designated area 320 is surrounded by an encrypted area 330a. FIG. 17B illustrates markers M1, M2, M3, and M4 placed in the respective marker areas R1, R2, R3, and R4.

The marker area detection unit 140 detects marker areas R1, R2, R3, and R4 within search areas Q1, Q2, Q3, and Q4 by removing their overlap with the encrypted area 330a. As seen in FIG. 17A, marker areas R1, R2, R3, and R4 have no overlap with the encrypted area 330a.

The encryption unit 130 encrypts data in the designated area 320, thus producing an encrypted area 320a.

The marking unit 150 places markers M1, M2, M3, and M4 at the highest-priority position in the respective marker areas R1, R2, R3, and R4 attached to the encrypted area 320a.

As can be seen from the above, the image processing apparatus 100 places markers M1, M2, M3, and M4 at appropriate positions along the boundary of an encrypted area 320a even though the encrypted area 320a has a plurality of edges touching another encrypted area 330a.

The markers M1, M2, M3, and M4 placed in this way permit the image processing apparatus 200 to decrypt data in the encrypted area 320a properly.

The next few sections of this description will now discuss how the image processing apparatus 200 decrypts data.

Figure 18:
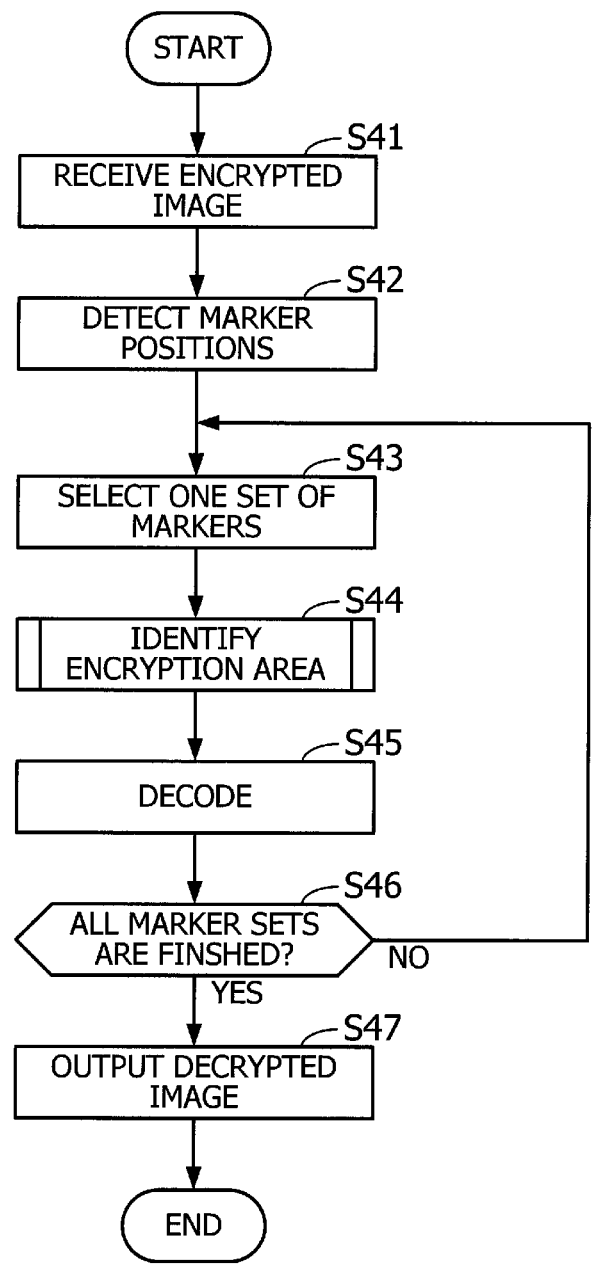
FIG. 18 is a flowchart of a decryption process.

FIG. 18 is a flowchart of a decryption process. Each step of this process is described below in the order of step numbers.

(Step S41) The marker position detection unit 220 receives an encrypted image 300a.

(Step S42) The marker position detection unit 220 detects marker positions in the received encrypted image 300a on the basis of shape and color pattern of markers, with reference to decryption control data stored in the decryption control data storage unit 210. For example, an area in the encrypted image 300a is detected as a marker position when the area has a specific shape and color pattern that match with those defined in the decryption control data.

(Step S43) The encrypted area detection unit 230 selects one set of markers (hereafter "marker set"). Specifically, an encrypted area has markers at its four corners, each having a distinct shape. The encrypted area detection unit 230 identifies these markers as the marker set demarcating that encrypted area. When there are a plurality of marker sets, they are selected in an appropriate order. For example, marker sets may be selected in the order that their constituent markers are detected at step S42. For another example, marker sets may be selected in ascending order of their coordinate values (e.g., y-axis coordinates) in the encrypted image 300a.

(Step S44) The encrypted area detection unit 230 identifies an encrypted area based on the selected marker set and outputs the identified encrypted area to the decryption unit 240.

(Step S45) The decryption unit 240 decrypts the encrypted area received from the encrypted area detection unit 230.

(Step S46) The decryption unit 240 determines whether there are any other pending encrypted areas in the encrypted image 300a. When a pending area is found, the decryption unit 240 goes back to step S43. When it is found that all encrypted areas are done, the decryption unit 240 advances the process to step S47.

(Step S47) The decryption unit 240 has decrypted all encrypted areas in the encrypted image 300a, and thus closes the present process after outputting the resulting decrypted image 300b.

The above process identifies a marker set for each encrypted area in the encrypted image 300a, and decrypts the encrypted area indicated by the marker set. When all encrypted areas are decrypted, the resulting decrypted image 300b is output to, for example, a monitor connected to the image processing apparatus 200.

The next section will provide details of step S44 described above. It is assumed now that some reference markers are embedded in an encrypted area 320a selected out of the encrypted image 300a.

Figure 19:
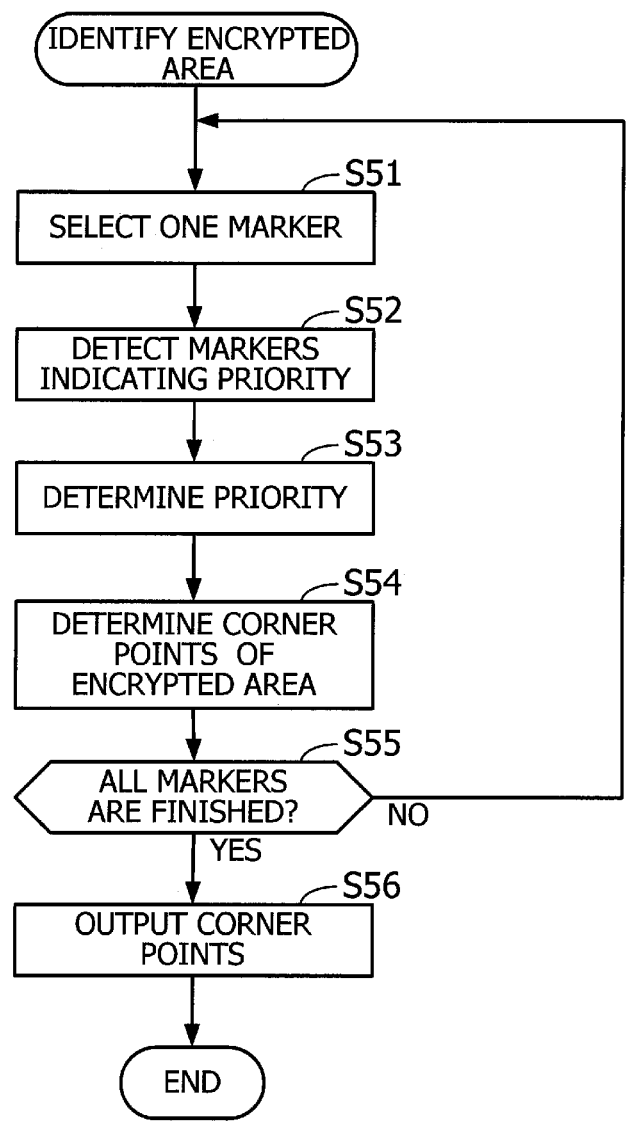
FIG. 19 is a flowchart illustrating a process of identifying encrypted areas.

FIG. 19 is a flowchart illustrating a process of identifying encrypted areas. Each step of this process is described below in the order of step numbers.

(Step S51) The encrypted area detection unit 230 selects one marker out of the current marker set in an appropriate order. For example, markers M1, M2, M3, and M4 are selected in that order. Suppose here that the encrypted area detection unit 230 has selected a marker M1, for example.

(Step S52) The encrypted area detection unit 230 detects the positions of reference markers. For example, the encrypted area detection unit 230 obtains arrangement patterns of reference markers M5, M6, M7, and M8 corresponding to the selected marker M1, by consulting decryption control data stored in the decryption control data storage unit 210. More specifically, if observed markers match with one of those arrangement patterns, then the encrypted area detection unit 230 takes them as reference markers M5, M6, M7, M8 and thus detects their respective positions.

(Step S53) The encrypted area detection unit 230 investigates locational relationships between the selected marker and each associated reference marker, thus determining which priority was used to place the selected marker. The encrypted area detection unit 230 achieves this by using the method discussed for determination of the priority of marker M1 from reference markers M5, M6, M7, and M8 in FIGS. 13A and 13B.

(Step S54) Based on the priority of the selected marker, the encrypted area detection unit 230 searches a priority table stored in the decryption control data storage unit 210, thereby determining a locational relationship between the selected marker and encrypted area 320a. Based on the determined locational relationship, the encrypted area detection unit 230 then determines the position of each corner point of the encrypted area 320a which corresponds to the selected marker. Suppose, for example, that the selected marker M1 has been determined to be of a priority of "2." In this case, the designated area 320 learns from the priority table that the encrypted area 320a has its corner point corresponding to marker M1 at the position that would be adjacent to the inner corner of marker M1 if moved upward by half a block. The encrypted area detection unit 230 gives a "finished" status to the selected marker.

(Step S55) The encrypted area detection unit 230 determines whether all markers in the given marker set have undergone the above steps. If all markers are finished, the encrypted area detection unit 230 advances the process to step S56. If there is a pending marker, the encrypted area detection unit 230 goes back to step S51.

(Step S56) Now that the corner points of the encrypted area 320a are determined through the above processing of steps S51 to S56, the encrypted area detection unit 230 informs the decryption unit 240 of these corner points and then exits from the process.

In the way described above, the encrypted area detection unit 230 obtains information indicating corner points of an encrypted area 320a and passes it to the decryption unit 240.

The next section will describe a variation of the above described processing of step S44. The above process of FIG. 19 assumes that reference markers are embedded in the encrypted area 320a as seen in FIGS. 13A and 13B. In contrast, the following process assumes that markers have different pixel patterns depending on their priorities as discussed in FIGS. 14A and 14B. It is also assumed that an encrypted area 320a is currently selected from among those in an encrypted image 300a.

Figure 20:
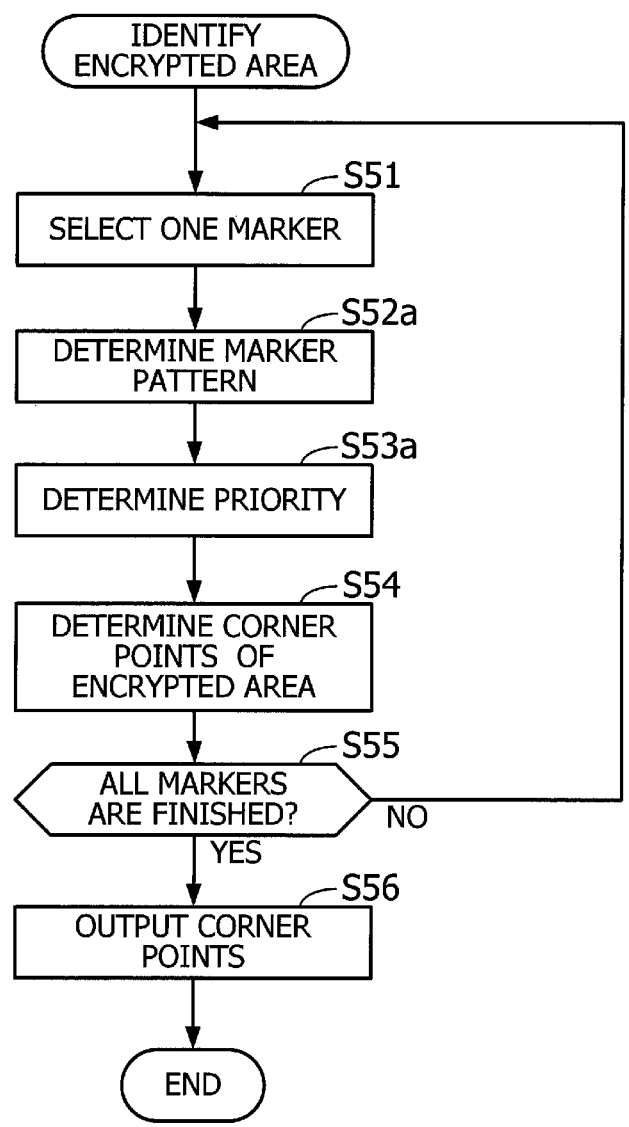
FIG. 20 is a flowchart illustrating a variation of the process of identifying encrypted areas.

FIG. 20 is a flowchart illustrating a variation of the above process of identifying encrypted areas. FIG. 20 is different from FIG. 19 in that steps S52a and S53a are executed instead of the foregoing steps S52 and S53. For the other steps, see the above discussion in FIG. 19.

(Step S52a) The encrypted area detection unit 230 detects a color pattern of a marker. For example, the encrypted area detection unit 230 detects that marker M1 is formed from white and black pixels arranged in a specific pattern.

(Step S53a) With the detected pattern, the encrypted area detection unit 230 determines which priority was used to place the marker in question. The encrypted area detection unit 230 achieves this by using the method that was discussed previously in FIGS. 14A and 14B for determination of the priority of marker M1.

The above procedure similarly permits the encrypted area detection unit 230 to obtain information indicating corner points of an encrypted area 320a. The encrypted area detection unit 230 passes the obtained information to the decryption unit 240.

Based on the information supplied from the encrypted area detection unit 230, the decryption unit 240 determines boundaries of the encrypted area 320a and decrypts data in that area.

The marker M1 may overlap with the encrypted area 320a. When this is the case, the decryption unit 240 performs interpolation or extrapolation of pixel values to recover the overlapped portion during the course of decryption.

The method of interpolation or extrapolation may depend on what algorithm the encryption unit 130 and decryption unit 240 use for data protection. Specifically, the following two methods are applicable.

First method: This method applies when the marker M1 overlaps with the area 321a as seen in FIG. 15A, and if it is possible to decrypt the encrypted area 320a without data in that overlapping area. The decryption unit 240 decrypts the rest of the encrypted area 320a, individually for each divided area 321a, 322a, 323a, and 324a, or collectively for the entire encrypted area 320a. The decryption unit 240 then interpolates or extrapolates the decrypted pixel values around marker M1 to estimate the values of hidden pixels in the area of marker M1. In the case where reference markers M5, M6, M7, and M8 are used, the decryption unit 240 executes interpolation or extrapolation in the same way as it does for marker M1. For example, the method proposed in Japanese Laid-open Patent Publication No. 2009-232233 may be used for the above interpolation or extrapolation.

Second method: This method applies when the area 321a is scaled down into an area 321b as discussed in FIG. 15B. The decryption unit 240 expands the area 321b back to its original size before decrypting the encrypted area 320a.

The encryption unit 130 may be configured to execute encryption without including the area of marker M1. When this is the case, the encryption unit 130 determines an encryption area by removing the area of marker M1, whose position is determined and informed of by the marking unit 150. The above-noted first method of interpolation and extrapolation also applies to this case. That is, the decryption unit 240 decrypts pixels without including those of marker M1 and then interpolates or extrapolates the decrypted pixel values around marker M1 to estimate the values of hidden pixels in the area of marker M1.

The decryption unit 240 provides a decrypted image 300b in this way.

With the features described above, the image processing apparatus 100 places markers at proper locations to demarcate encrypted areas 310a and 320a even in the case where designated areas 310 and 320 are closely located. Specifically, the image processing apparatus 100 is configured to detect marker areas for new markers before encrypting a designated area 320. These marker areas do not overlap with an existing encrypted area 310a and its associated markers. The image processing apparatus 100 then determines where to place markers in the detected marker areas according to predetermined priority conditions.

The above markers permit another image processing apparatus 200 to locate the encrypted areas 310a and 320a correctly, in spite of their close proximity. Each encrypted area can therefore be deciphered in a proper way.

The proposed features contribute to a higher degree of freedom in the layout of a plurality of encrypted areas. More particularly, it is possible to lay out encrypted areas at closer locations than the conventional apparatuses can do.

The above-described marker placement method may similarly be used to print a plurality of two-dimensional codes on a single medium. The proposed method reduces the space for two-dimensional codes because of its ability to lay out such codes at closer locations.

The shape of markers is not limited by the examples discussed in the present embodiment. Rather, markers may have a variety of shapes as will be described below.

Figure 21A:
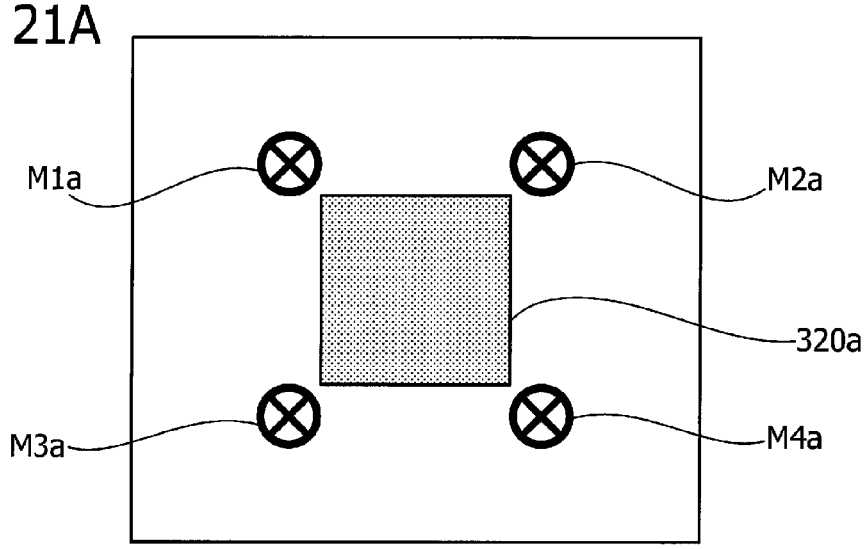
FIGS. 21A and 21B illustrate a first variation of markers and marker areas.
Figure 21B:
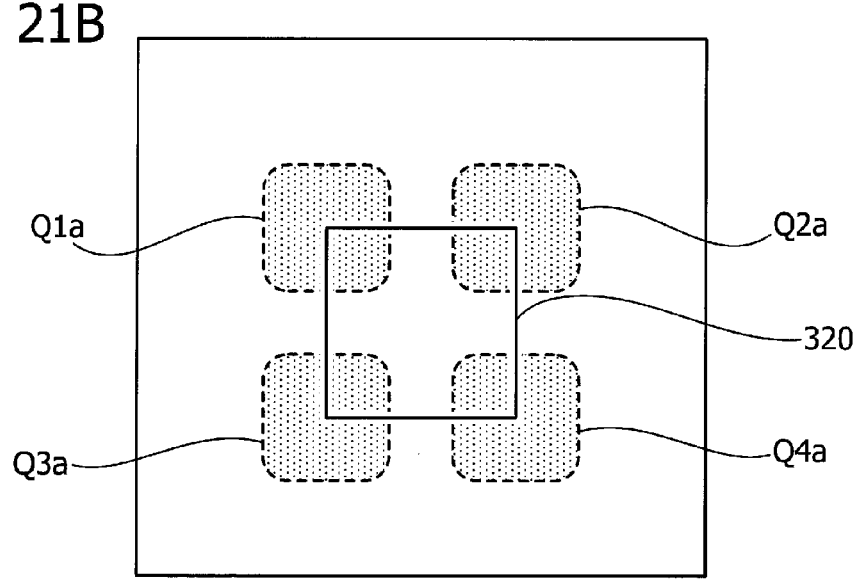

FIGS. 21A and 21B illustrate a first variation of markers and marker areas. FIG. 21A illustrates an option for the shape and pixel pattern of markers. FIG. 21B illustrates search areas for such markers.

Markers M1a, M2a, M3a, and M4a are placed in the vicinity of four corners of an encrypted area 320a. These markers M1a, M2a, M3a, and M4a have a particular pixel pattern that is formed from a black circle and a black cross "x" in that circle. This pattern may further be modified by changing, for example, the thickness of the black circle. Other modifications may change the ratio of thickness between two black lines constituting the cross, or alter the crossing angle of these two lines. The resulting variations add more options to the pixel pattern of markers.

The image processing apparatus 100 may use such markers M1*a*, M2*a*, M3*a*, and M4*a* in place of the foregoing markers M1, M2, M3, and M4.

The image processing apparatus 200 determines the boundaries of the encrypted area 320*a* by detecting those markers M1*a*, M2*a*, M3*a*, and M4*a*.

Search areas Q1*a*, Q2*a*, Q3*a*, and Q4*a* are potential locations of markers M1*a*, M2*a*, M3*a*, and M4*a* around a designated area 320. The control data storage unit 110 stores control data that defines such search areas Q1*a*, Q2*a*, Q3*a*, and Q4*a* containing four corners of the designated area 320.

The marker area detection unit 140 may be configured to minimize the search areas Q1*a*, Q2*a*, Q3*a*, and Q4*a*, depending on the shape of markers M1*a*, M2*a*, Mia, and M4*a*. By so doing, the marker area detection unit 140 reduces the time for detecting marker areas.

Figure 22A:
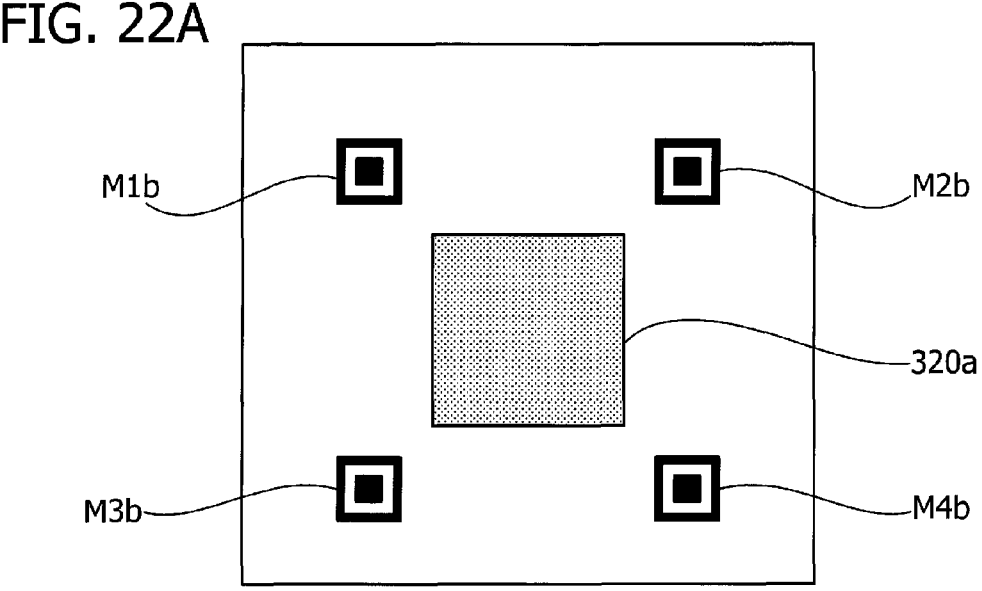
FIGS. 22A and 22B illustrate a second variation of markers and marker areas.
Figure 22B:
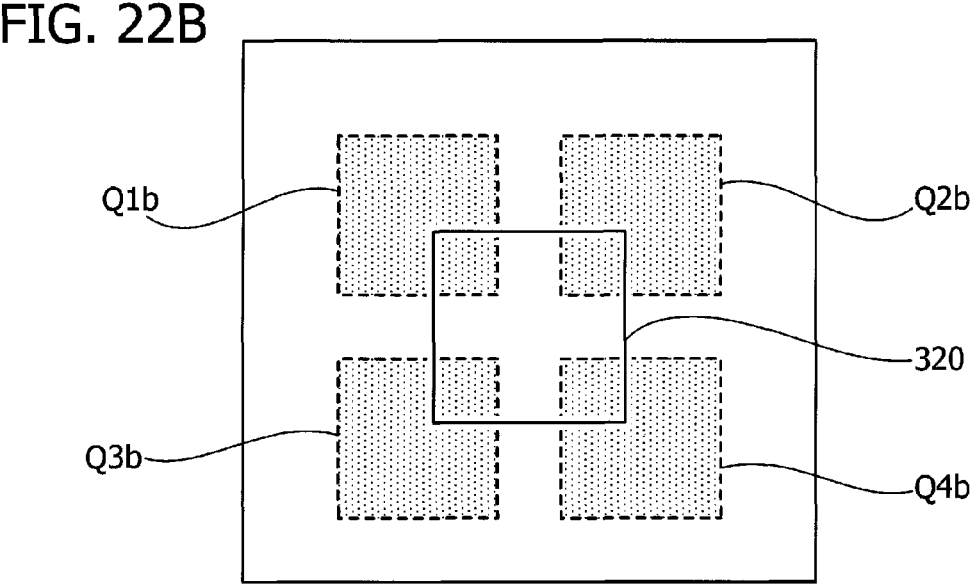

FIGS. 22A and 22B illustrate a second variation of markers and marker areas. FIG. 22A illustrates another option for the shape and pixel pattern of markers. FIG. 22B illustrates search areas for such markers.

Markers M1*b*, M2*b*, M3*b*, and M4*b* are placed at four corners of an encrypted area 320*a*. These markers M1*b*, M2*b*, M3*b*, and M4*b* have a particular pixel pattern that is formed from a black rectangular frame and a black solid box in that frame. This pattern may further be modified by changing, for example, the proportion of the inner black box to the outer black frame. The resulting variations add more options to the pixel pattern of markers.

Search areas Q1*b*, Q2*b*, Q3*b*, and Q4*b* are potential locations of markers M1*b*, M2*b*, M3*b*, and M4*b* around a designated area 320. The control data storage unit 110 stores control data that defines such search areas Q1*b*, Q2*b*, Q3*b*, and Q4*b* containing four corners of the designated area 320.

Priority tables are also prepared in the control data storage unit 110 when the image processing apparatus 100 uses the markers illustrated in FIGS. 21 and 22. Using this control data storage unit 110, the image processing apparatuses 100 and 200 perform their processing operations similar to what they do for the foregoing markers M1, M2, M3, and M4. Accordingly, the image processing apparatuses 100 and 200 achieve the same effects as they do with the foregoing markers M1, M2, M3, and M4. The markers illustrated in FIGS. 21 and 22 also have different priorities depending on their relative locations with respect to the designated area. For example, a lower priority is given to markers when their location is closer to the designated area. Further, a lower priority is given to markers when their location is closer to the center of the designated area.

Third Embodiment

This section describes a third embodiment with reference to the accompanying drawings. The description of the third embodiment will focus on its difference from the foregoing second embodiment. See the previous sections for their common features.

In the second embodiment described above, there are two areas 310*a* and 320*a* encrypted in that order. The marker positions for the latter encrypted area 320*a* have thus to be adjusted with consideration of the existing encrypted area 310*a*. However, a designated area 320 for the latter encrypted area 320*a* may overlap with an existing marker of the former encrypted area 310*a*. If this is the case, it is not always possible to place new markers.

The third embodiment deals with the above case by trying to place markers for the new encrypted area 320*a* while adjusting the existing marker of the encrypted area 310*a*. The following description is directed to an image processing apparatus designed to perform such adjustment of existing markers.

The third embodiment is intended for use in the same information processing system whose overall structure has been discussed in the second embodiment with reference to FIG. 2. See the previous description for details of the system structure. The information processing system of the third embodiment, however, includes an image processing apparatus 100*a* in place of the image processing apparatus 100 in FIG. 2. This image processing apparatus 100*a* has the same hardware configuration as the one discussed for the image processing apparatus 100 in FIG. 3. See the previous description for details of the hardware configuration.

Figure 23:
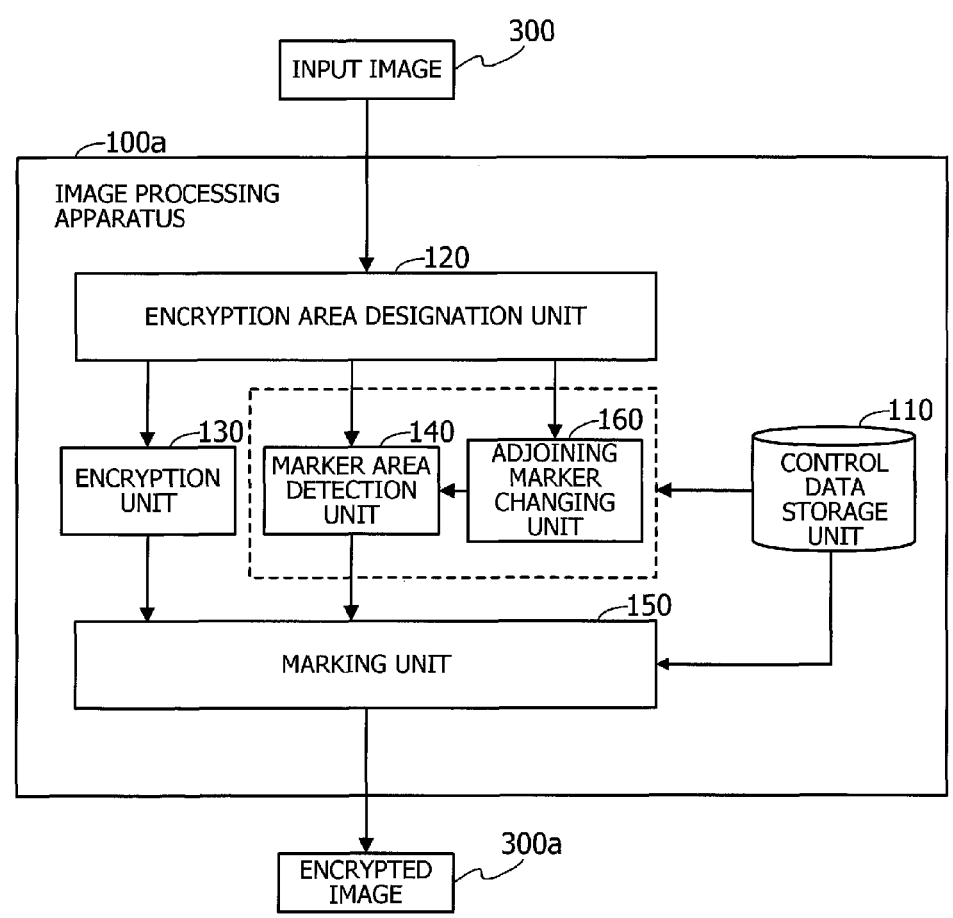
FIG. 23 illustrates a structure of an image processing apparatus according to a third embodiment.

FIG. 23 illustrates a structure of an image processing apparatus according to the third embodiment. The illustrated image processing apparatus 100*a* includes a control data storage unit 110, an encryption area designation unit 120, an encryption unit 130, a marker area detection unit 140, a marking unit 150, and an adjoining marker changing unit 160. These functions are realized as programs executed by the CPU 101. Alternatively, all or part of these functions may be implemented as a dedicated hardware device(s).

The control data storage unit 110, encryption area designation unit 120, encryption unit 130, marker area detection unit 140, and marking unit 150 are equivalent to their respective counterparts in the foregoing image processing apparatus 100 of FIG. 4, with the same names and reference numerals. For the details of these elements, see relevant part of the previous description.

It is noted, however, that the encryption area designation unit 120 is modified to supply information about designated areas also to the adjoining marker changing unit 160.

Each existing encrypted area is marked with a set of markers for the purpose of distinction from other areas. Some of these markers may overlap with a designated area designated by the encryption area designation unit 120. The adjoining marker changing unit 160 changes the positions of such markers (hereafter referred to as "adjoining markers"). More specifically, the adjoining marker changing unit 160 moves adjoining markers to other positions with a lower priority by manipulating data of the input image 300 with reference to a relevant priority table 111 stored in the control data storage unit 110.

When an adjoining marker(s) is found in the input image 300, the marker area detection unit 140 detects marker areas based on the input image 300 modified by the adjoining marker changing unit 160.

As will be seen in the following description, the markers M1, M2, M3, and M4 in the second embodiment are also used in the fourth embodiment. It is possible, however, to use other markers with different shapes (e.g., those discussed in FIGS. 21 and 22).

The following section provides details of processing operation executed by the above image processing apparatus 100*a*.

Figure 24:
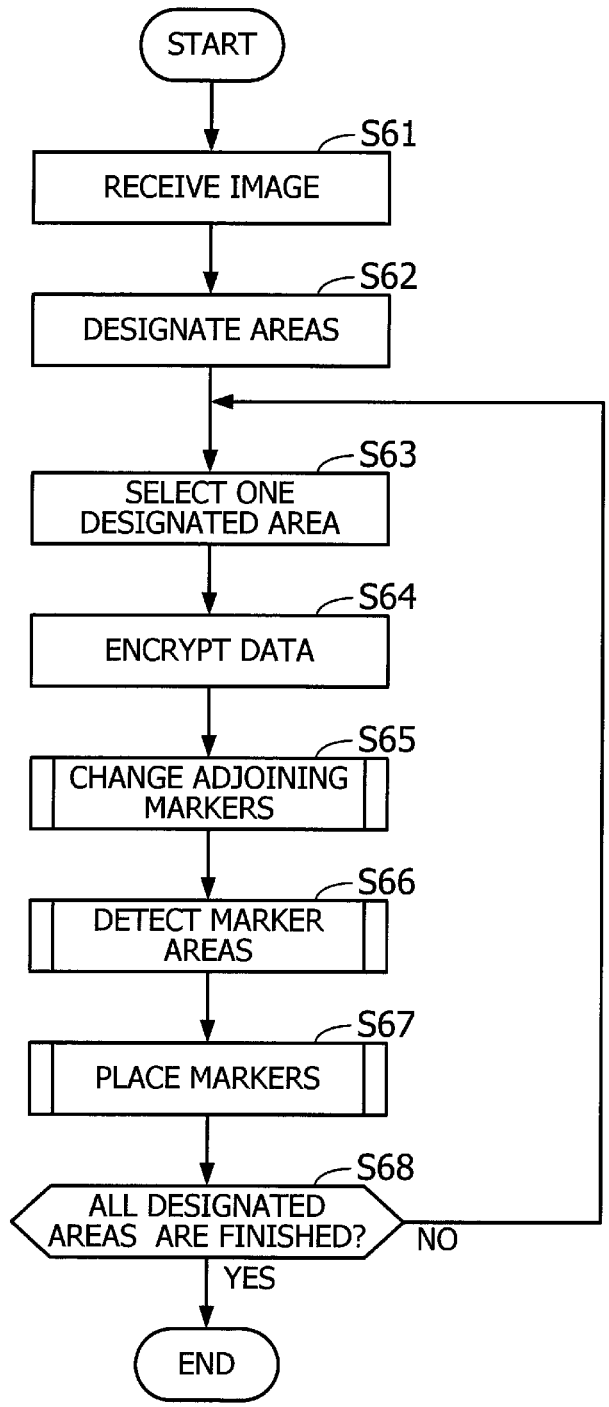
FIG. 24 is a flowchart illustrating an encryption process according to the third embodiment.

FIG. 24 is a flowchart illustrating an encryption process according to the third embodiment. Each step of this process is described below in the order of step numbers.

(Step S61) The encryption area designation unit 120 receives an input image 300.

(Step S62) The encryption area designation unit 120 permits the user to designate a specific area(s) in the input image 300. It is assumed now that the user has designated two or more areas.

(Step S63) The encryption area designation unit 120 selects one of the designated areas. The order of this selection may be determined in the same way as in step S13 of FIG. 9. Suppose, for example, that there are two designated areas 310 and 320. The encryption area designation unit 120 selects the former area 310 in the first place and informs the encryption unit 130, marker area detection unit 140, and adjoining marker changing unit 160 of the selected area.

(Step S64) The encryption unit 130 encrypts the designated area in the input image 300 that is informed of by the encryption area designation unit 120. The encryption unit 130 produces and stores control data in the control data storage unit 110 to record which part of the input image 300 is encrypted. For example, this control data may indicate the corner points of the encrypted area.

(Step S65) The adjoining marker changing unit 160 detects adjoining markers and changes their locations.

(Step S66) With reference to control data stored in the control data storage unit 110, the marker area detection unit 140 obtains search areas Q1, Q2, Q3, and Q4 relevant to the designated area informed of by the encryption area designation unit 120. Out of these search areas Q1, Q2, Q3, and Q4, the marker area detection unit 140 detects appropriate marker areas by excluding coordinate points that overlap with other encrypted areas or their associated markers. The marker area detection unit 140 provides the marking unit 150 with the detected marker areas.

(Step S67) With reference to a relevant priority table 111 stored in the control data storage unit 110, the marking unit 150 places a marker at the highest-priority position in each marker area so as to indicate the encrypted area in the input image 300. The marking unit 150 adds control data to the control data storage unit 110 to record the marked areas (e.g., record the corner positions of each area).

(Step S68) The marking unit 150 determines whether there is any other pending designated area in the input image 300. If there is, the marking unit 150 advances the process to step S63. If all the designated area are finished, the marking unit 150 outputs the resulting encrypted image 300a, thus terminating the present process.

As can be seen from the above steps, the image processing apparatus 100 encrypts data locally in each designated area. During this course, the image processing apparatus 100 seeks adjoining markers and changes their positions.

The above process executes encryption at step S64. Alternatively, the flowchart may be modified to perform the same immediately before the marker placement of step S67.

The next section will provide more details of step S65 described above.

Figure 25:
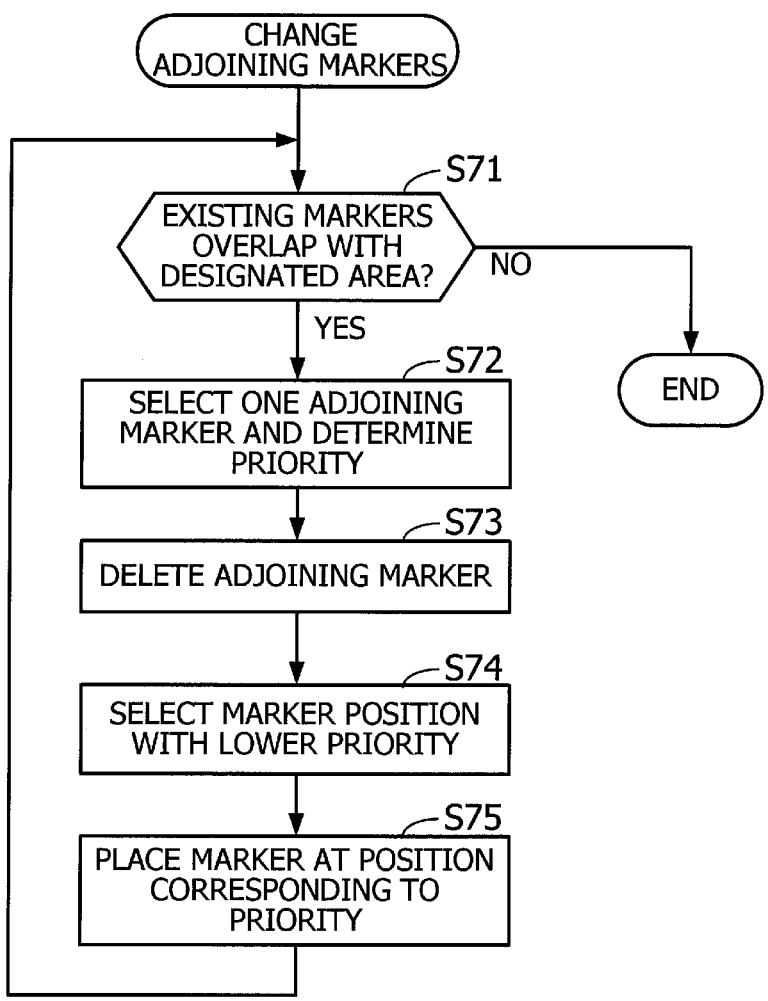
FIG. 25 is a flowchart illustrating how adjoining markers are changed according to the third embodiment.

FIG. 25 is a flowchart illustrating how adjoining markers are changed according to the third embodiment. Each step of this process is described below in the order of step numbers.

(Step S71) The adjoining marker changing unit 160 determines whether any existing markers overlap with the designated area designated by the encryption area designation unit 120. When such overlap is found, the adjoining marker changing unit 160 advances the process to step S72. When no such overlap is found, the adjoining marker changing unit 160 exits from the present process.

(Step S72) The adjoining marker changing unit 160 selects an adjoining marker, i.e., one of those overlapping markers. The adjoining marker changing unit 160 then determines which priority was used to place the selected adjoining marker. The priority of adjoining markers may be determined in the same way discussed above in FIGS. 19 and 20. Alternatively, the priority of adjoining markers may be recorded in the control data storage unit 110 when they are placed, so that the adjoining marker changing unit 160 can consult the record later to determine the priority. As another alternative, the priority of adjoining markers may be recorded in the header of the image data when they are placed, so that the adjoining marker changing unit 160 can consult the header information later to determine the priority.

(Step S73) The adjoining marker changing unit 160 deletes the selected adjoining marker. The adjoining marker changing unit 160 fills the vacated area by using interpolation or extrapolation techniques. More specifically, the adjoining marker changing unit 160 may use the method described in Japanese Laid-open Patent Publication No. 2009-232233. For example, pixel values may be estimated from image data in the surrounding areas. Alternatively, the deleted area may be recovered from a partial original image that was previously saved.

(Step S74) The adjoining marker changing unit 160 selects a priority that is lower than the priority determined at step S72 for the now-deleted adjoining marker. For example, the adjoining marker changing unit 160 may select a priority that is one rank lower than the priority of step S72. The adjoining marker changing unit 160 then consults a relevant priority table 111 in the control data storage unit 110 to find a marker position with the selected priority.

(Step S75) The adjoining marker changing unit 160 places a marker at the determined marker position as an alternative to the deleted adjoining marker. The adjoining marker changing unit 160 then return to step S71.

The above process changes the positions of adjoining markers one by one until no overlap of markers with the designated area is observed.

FIGS. 26 and 27 provide some examples illustrating how markers are placed according to the third embodiment.

The encryption area designation unit 120 receives input of designated areas 310 and 320 in an input image 300. Both designated areas 310 and 320 are box-shaped, and one designated area 310 is in contact with another designated are 320 at one of their corner points. The encryption area designation unit 120 first selects the former designated area 310 out of the two. The encryption unit 130 produces an encrypted area 310a from the designated area 310, and the marking unit 150 adds markers to the encrypted area 310a.

The encryption area designation unit 120 then selects the other designated area 320.

The adjoining marker changing unit 160 now detects an adjoining marker MA1 as one of the markers added to the encrypted area 310a. The adjoining marker changing unit 160 then determines which priority was used to place this adjoining marker MA1. For example, the adjoining marker changing unit 160 finds the priority to be "1" (step ST1).

The adjoining marker changing unit 160 deletes the adjoining marker MA1 and fills the vacated area by using appropriate techniques (step ST2).

There may have been several positions suitable for the adjoining marker MA1. The adjoining marker changing unit 160 selects a position with a lower priority from among those positions and places an alternative marker at that position. For example, the adjoining marker changing unit 160 places a marker at a position with a priority of "2," which is one rank lower than the original priority of "1." The adjoining marker changing unit 160 moves the marker until it reaches a position having no overlap with the designated area 320, by successively lowering the priority (i.e., by repeating steps ST1 and ST2). Finally the adjoining marker changing unit 160 places a marker MA1a at the position with a priority of "4," for example. This position of the new marker MA1a resolves the overlap with the designated area 320. The adjoining marker changing unit 160 thus finishes the process of changing adjoining markers (step ST3).

Based of the image data including adjoining markers modified above by the adjoining marker changing unit 160, the marker area detection unit 140 detects search areas for the designated area 320 that the encryption unit 130 has encrypted. The marking unit 150 places a marker at the highest-priority position within each search area that the marker area detection unit 140 has detected. As a result of this operation, a marker MB1 is added to the position next to the corner of marker MA1a. For example, the position of this marker MB1 is of a priority of "4," which is selected to avoid overlap with the marker MA1a.

As can be seen from the above, the proposed image processing apparatus 100a is designed to add markers to a designated area after moving an adjoining marker, if any, to another place that resolves the overlap with the designated area. This feature of the image processing apparatus 100a enables proper placement of markers for a designated area even in the case where some existing markers overlap with the designated area.

The above-described processing of the third embodiment enhances the degree of freedom in laying out a plurality of encrypted areas, when compared with the foregoing second embodiment. This means that the encrypted areas can be located more closely. The third embodiment thus contributes to more space-efficient layout of encrypted areas.

Fourth Embodiment

This section describes a fourth embodiment with reference to the accompanying drawings. The description of the fourth embodiment will focus on its difference from the foregoing second and third embodiments. See the previous sections for their common features.

The foregoing second and third embodiments seek an appropriate position for a new marker to avoid its overlap with other existing markers. However, it may also be possible to use a portion of an existing marker as part of a new marker, under some specific conditions of the shape of markers used or locational relationships between markers. The fourth embodiment provides an image processing apparatus that enables such partial sharing of markers.

The fourth embodiment is intended for use in the same information processing system whose overall structure has been discussed in the second embodiment with reference to FIG. 2. See the previous description for details of the system structure. The information processing system of the fourth embodiment, however, includes an image processing apparatus 100b in place of the image processing apparatus 100 in FIG. 2. This image processing apparatus 100b has the same hardware configuration as the one discussed in FIG. 3 for the image processing apparatus 100. See the previous description for details of the hardware configuration.

The following description assumes that the foregoing markers M1, M2, M3, and M4 in the second embodiment are used also in the fourth embodiment.

Figure 28:
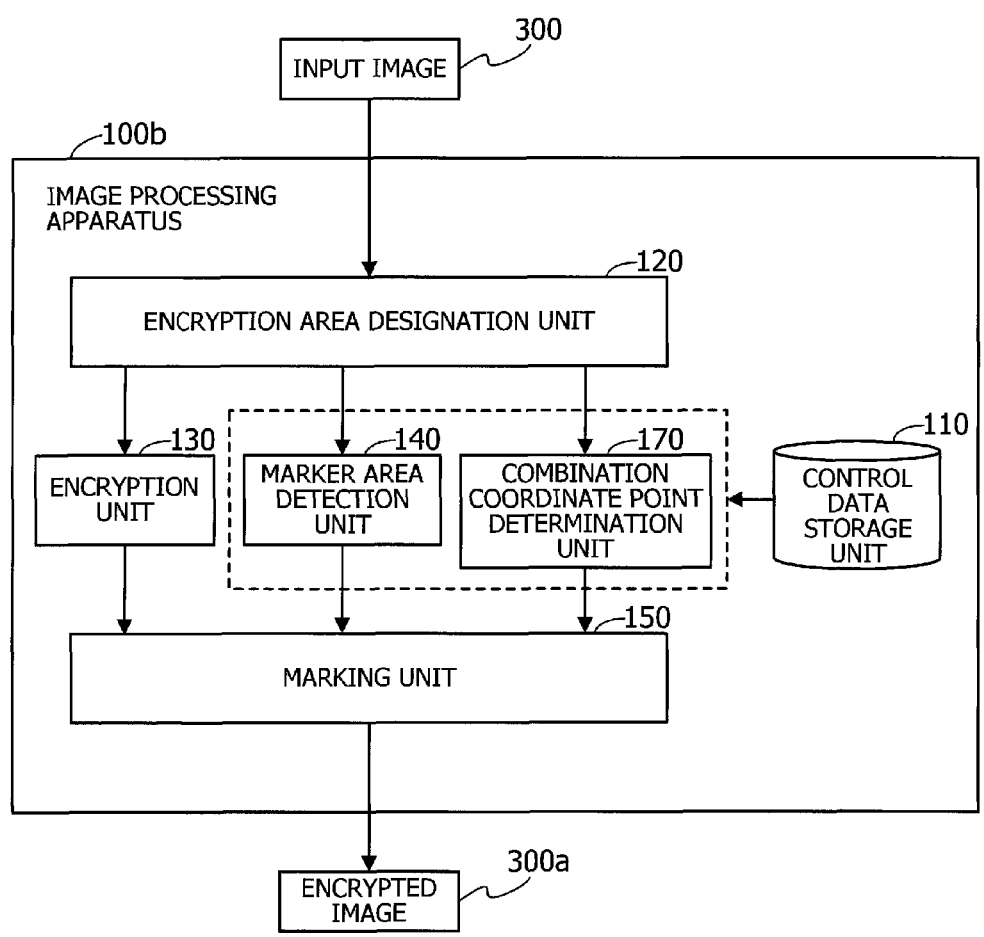
FIG. 28 illustrates a structure of an image processing apparatus according to a fourth embodiment.

FIG. 28 illustrates a structure of an image processing apparatus according to the fourth embodiment. The illustrated image processing apparatus 100b includes a control data storage unit 110, an encryption area designation unit 120, an encryption unit 130, a marker area detection unit 140, a marking unit 150, and a combination coordinate point determination unit 170. These functions are realized as programs executed by the CPU 101. Alternatively, all or part of these functions may be implemented as a dedicated hardware device(s).

The control data storage unit 110, encryption area designation unit 120, encryption unit 130, marker area detection unit 140, and marking unit 150 are equivalent to their respective counterparts in the foregoing image processing apparatus 100 of FIG. 4, with the same names and reference numerals. For the details of these elements, see the previous description.

With reference to the control data storage unit 110, the combination coordinate point determination unit 170 determines a combination coordinate point based on the positions of a search area and existing markers in the input image 300. The term "combination coordinate point" refers to the coordinates representing a point at which an additional marker with a different shape is to be placed in combination with one of the existing markers M1, M2, M3, and M4. Specifically, markers M1, M2, M3, and M4 are in the shape of letter "L" and composed of two bars that join at one end. The noted additional marker may be placed at that end point (described later). The combination coordinate point determination unit 170 informs the marking unit 150 of the determined combination coordinate point.

When it has combination coordinate point provided from the combination coordinate point determination unit 170, the marking unit 150 uses that coordinate point to place a marker in preference to other potential marker positions. When it has no such combination coordinate point, the marking unit 150 consults a relevant priority table 111 in the control data storage unit 110 to find marker positions within a marker area provided from the marker area detection unit 140. The marking unit 150 then places a marker at the highest-priority position in the marker area.

The following section provides details of processing operation executed by the above image processing apparatus 100b.

Figure 29A:
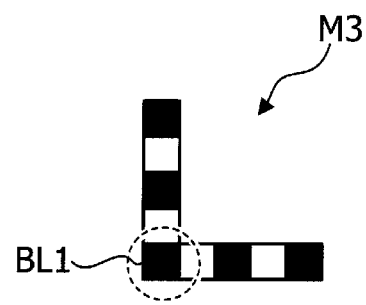
FIGS. 29A to 29C illustrate markers used for combining operation of the fourth embodiment.
Figure 29B:
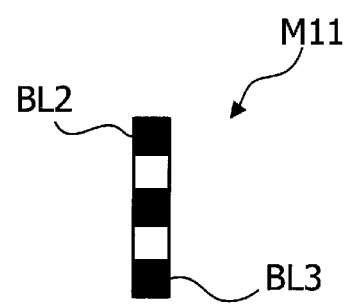
Figure 29C:
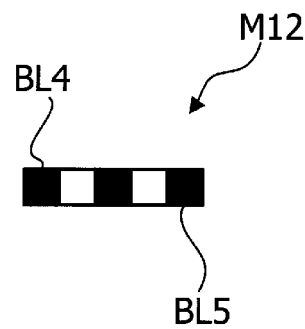

FIGS. 29A to 29C illustrate some markers used for combining operation of the fourth embodiment. FIG. 29A illustrates a joining position. FIG. 29B illustrates an example of additive markers. FIG. 29C illustrates another example of additive markers. FIGS. 29A to 29C illustrate an L-shaped maker M3 having a joining position BL1 at which the horizontal pixel pattern of marker M3 meets the vertical pixel pattern of the same. The combination coordinate point in this case represents the center of this joining position BL1.

Additive markers M11 and M12 are defined as additional markers that may be placed at the joining position BL1 of markers M1, M2, M3, and M4.

One additive marker M11 has two joining positions BL2 and BL3. For example, the marker M3 may be combined with this additive marker M11 by overlaying the latter on the former in such a way that their joining positions BL1 and BL2 are aligned with each other.

The other additive marker M12 also has two joining positions BL4 and BL5. For example, the marker M3 may be combined with this additive marker M12 by overlaying the latter on the former in such a way that their joining positions BL1 and BL4 are aligned with each other.

It is noted that these additive markers M11 and M12 are placed only when they fit in a search area in their respective entireties.

Figure 30:
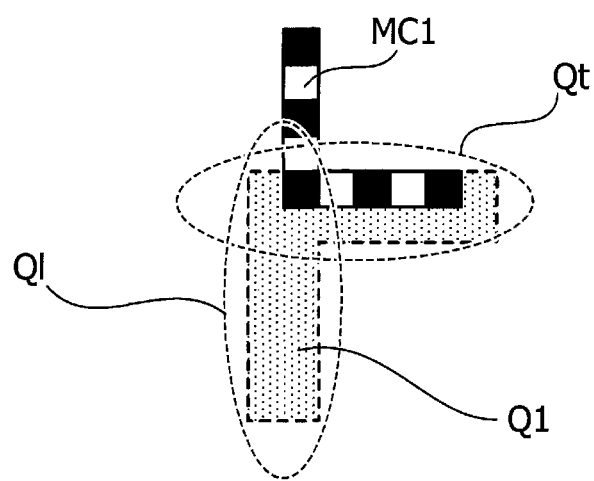
FIG. 30 illustrates a locational relationship between an existing marker and a search area according to the fourth embodiment.

FIG. 30 illustrates a locational relationship between an existing marker and a search area according to the fourth embodiment. The illustrated marker MC1 is one of those added to an existing encrypted area. The illustrated search area Q1 is formed from a top portion Qt and a left portion Q1. The top portion Qt and left portion Q1 partly overlap with each other. This overlapping area belongs to both the top portion Qt and left portion Q1.

As FIG. 30 illustrates, the horizontal bar of the existing marker MC1 lies within the top portion Qt of the search area Q1. This kind of state of markers may be expressed as "one element of the existing marker is wholly within the search area," as will be seen below.

Other search areas Q2, Q3, and Q4 may also be divided into constituent portions similarly to the above. For example, search area Q2 is divided into a top portion and a right portion. Search area Q3 is divided into a bottom portion and a left portion. Search area Q4 is divided into a bottom portion and a right portion.

The following section provides details of processing operation executed by the above image processing apparatus 100b.

Figure 31:
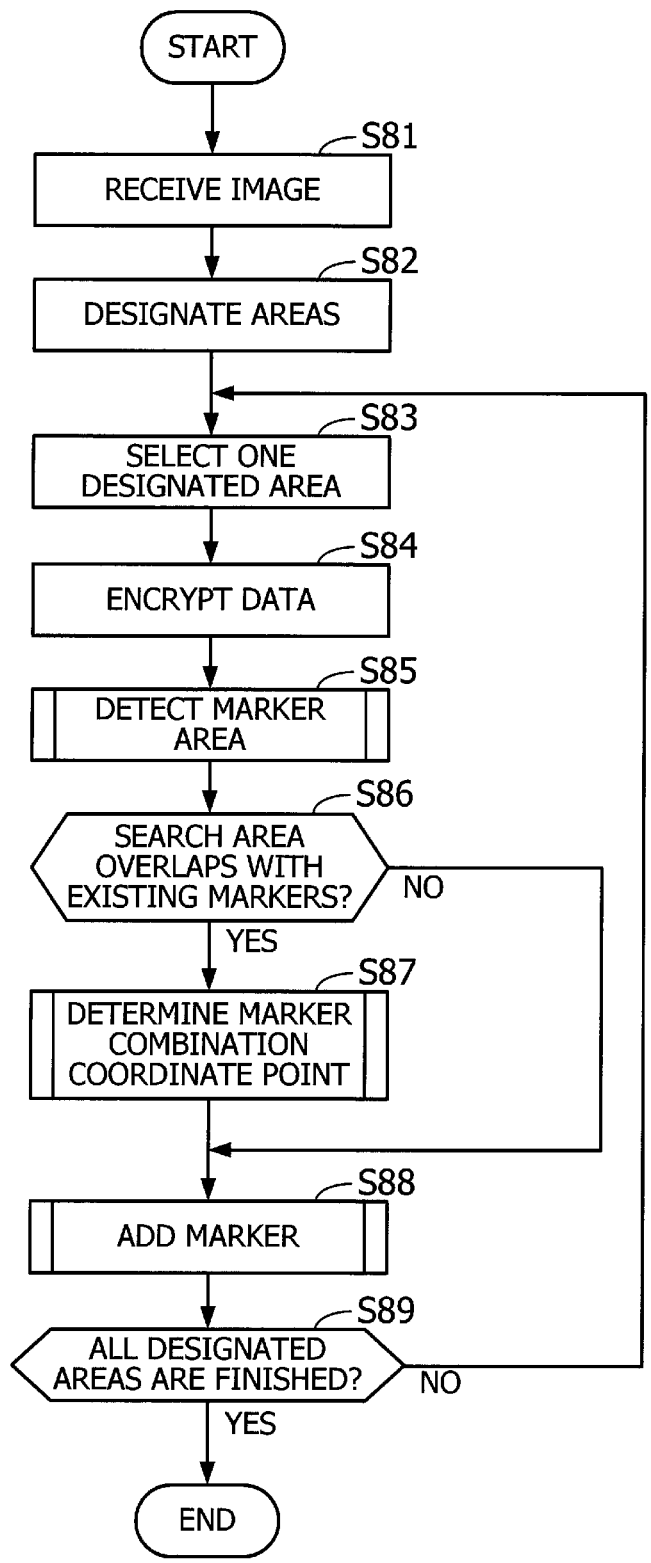
FIG. 31 is a flowchart illustrating an encryption process according to the fourth embodiment.

FIG. 31 is a flowchart illustrating an encryption process according to the fourth embodiment. Each step of this process is described below in the order of step numbers.

(Step S81) The encryption area designation unit 120 receives an input image 300.

(Step S82) The encryption area designation unit 120 permits the user to designate a specific area(s) in the input image 300. It is assumed now that the user has designated two or more areas.

(Step S83) The encryption area designation unit 120 selects one of the designated areas. The order of this selection may be determined in the same way as in step S13 of FIG. 9. Suppose, for example, that there are two designated areas 310 and 320. The encryption area designation unit 120 selects the former area 310 in the first place and informs the encryption unit 130 and marker area detection unit 140 of the selected area.

(Step S84) The encryption unit 130 encrypts the designated area in the input image 300 that is informed of by the encryption area designation unit 120. The encryption unit 130 produces and stores control data in the control data storage unit 110 to record which part of the input image 300 is encrypted. For example, this control data may indicate the corner points of the encrypted area.

(Step S85) With reference to control data stored in the control data storage unit 110, the marker area detection unit 140 obtains search areas Q1, Q2, Q3, and Q4 relevant to the designated area informed of by the encryption area designation unit 120. Out of these search areas Q1, Q2, Q3, and Q4, the marker area detection unit 140 detects appropriate marker areas by excluding coordinate points that overlap with other encrypted areas or their associated markers. The marker area detection unit 140 provides the marking unit 150 and combination coordinate point determination unit 170 with the detected marker areas.

(Step S86) The combination coordinate point determination unit 170 determines whether the selected search area overlaps with existing markers. If such overlap is found, the combination coordinate point determination unit 170 advances the process to step S87. If no such overlap is found, the combination coordinate point determination unit 170 advances the process to step S88. The word "overlap" is used here to mean that one element of an existing marker is wholly within the search area. If, for example, the foregoing existing marker MC1 does not satisfy this condition with respect to the search area Q1, combining an additive marker to the existing marker MC1 would not work well for the currently selected designated area. This is because the resulting marker would not have a proper shape or proper pixel pattern. For example, the combined marker could have a width of five blocks and a height of three blocks, whereas all markers are supposed to have dimensions of five by five blocks. For this reason, the combination coordinate point determination unit 170 is configured to combine markers only when one element of an existing marker is wholly within the search area.

(Step S87) The combination coordinate point determination unit 170 tries to combine an additive marker with the existing marker. When this works out properly, the combination coordinate point determination unit 170 obtains and supplies a combination coordinate point to the marking unit 150. When the combination does not work, the combination coordinate point determination unit 170 sends nothing to the marking unit 150.

(Step S88) When a combination coordinate point is received, the marking unit 150 places an additive marker at that coordinate point. When no combination coordinate point is received, the marking unit 150 consults a relevant priority table 111 in the control data storage unit 110 to find marker positions within a marker area provided from the marker area detection unit 140. The marking unit 150 then places a marker at the highest-priority position in the marker area. The marking unit 150 adds control data to the control data storage unit 110 to record the marked areas (e.g., record the corner positions of each area).

(Step S89) The marking unit 150 determines whether there is any pending designated area in the input image 300. If there is, the marking unit 150 advances the process to step S83. If all the designated area are finished, the marking unit 150 outputs the resulting encrypted image 300a, thus terminating the present process.

As can be seen from the above, a combination coordinate point is determined when there is an overlap between a search area and an existing marker. In this case, an additive marker is placed at the determined combination coordinate point in preference to normal markers.

The above process executes encryption at step S84. Alternatively, the flowchart may be modified to perform the same immediately before the marker placement of step S88.

The next section will provide details of step S87 described above.

Figure 32:
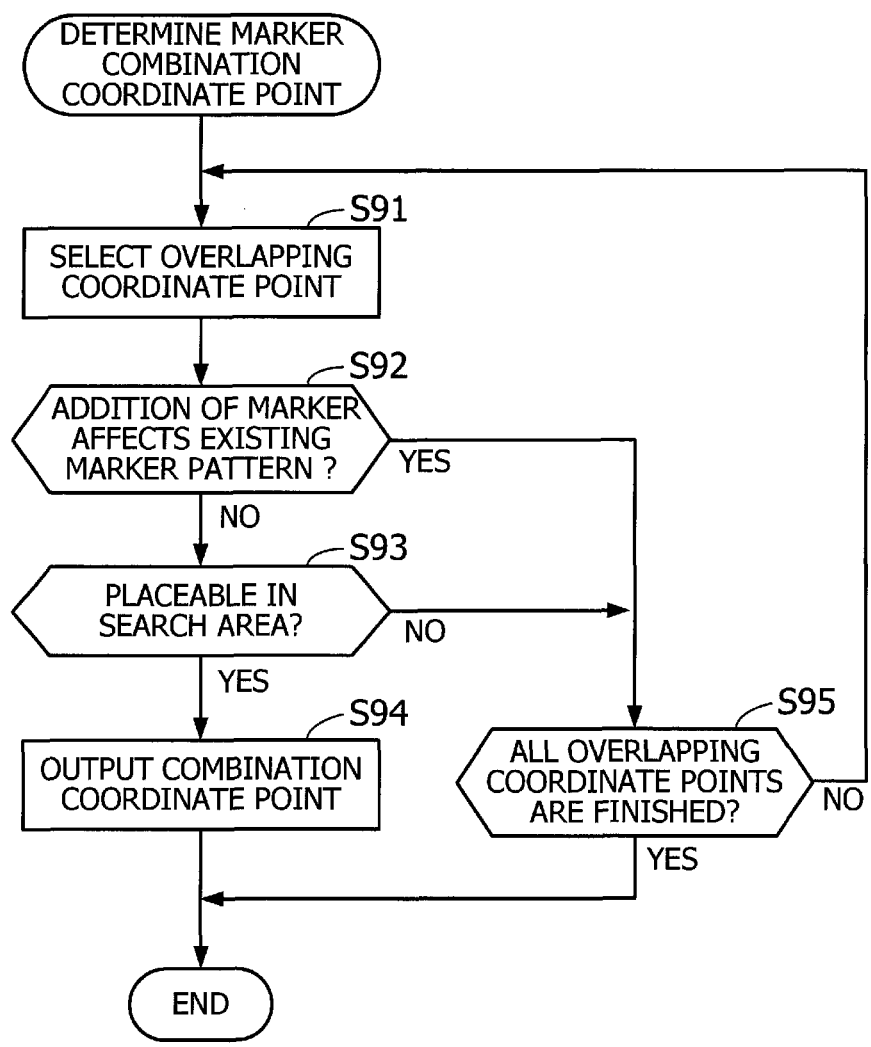
FIG. 32 is a flowchart illustrating a process of determining marker combination coordinates according to the fourth embodiment.

FIG. 32 is a flowchart illustrating a process of determining marker combination coordinates according to the fourth embodiment. Each step of this process is described below in the order of step numbers.

(Step S91) The combination coordinate point determination unit 170 selects one coordinate point from among those in an overlapping area of the search area with an existing marker.

(Step S92) The combination coordinate point determination unit 170 tries to place an additive marker at the selected coordinate point. The shape of this additive marker may vary, depending upon in which part of the designated area the marker area in question resides, and also upon in which part of the marker area the existing marker in question resides. Suppose, for example, that the search area Q1 overlaps with one element of an existing marker. Additive marker M11 is then selected when the overlap lies in the top portion Qt of the search area Q1. Additive marker M12 is selected when the overlap lies in the left portion Q1 of the search area Q1.

The combination coordinate point determination unit 170 now determines whether the additive marker, if placed at the selected coordinate point, would affect the pixel pattern of the existing marker. If no changes are expected, the combination coordinate point determination unit 170 advances the process to step S93. If the existing marker pattern is expected to "change," the combination coordinate point determination unit 170 advances the process to step S95. The word "change" is used here to mean, for example, that the marker's original color pattern (e.g., black-white-black-while-black) is affected by an additive marker and thus makes a different pattern (e.g., black-black-black-while-black, or black-white-black-black-black). Moreover, when the selected coordinate point is not the center of a block of the existing marker, the color of that block could be disturbed by an additive marker (i.e., white pixels could be introduced into a black block, and vice versa).

(Step S93) The combination coordinate point determination unit 170 determines whether the additive marker in question is placeable in the search area. When it is placeable, the combination coordinate point determination unit 170 advances the process to step S94. When it is not placeable, the combination coordinate point determination unit 170 advances the process to step S95.

(Step S94) The combination coordinate point determination unit 170 outputs the coordinate point selected at step S91, thus providing it to the marking unit 150 as a combination coordinate point. The combination coordinate point determination unit 170 then exits from the present process.

(Step S95) The combination coordinate point determination unit 170 determines whether all the overlapping coordinate points are finished. If a pending coordinate point is found, the combination coordinate point determination unit 170 advances the process back to step S91. If all the coordinate points are done, the combination coordinate point determination unit 170 exits from the present process.

The above process determines a combination coordinate point for placement of an additive marker. This determination is made by testing whether the additive marker would affect the pixel pattern of an existing marker if it was placed at each particular coordinate point in an overlapping area of the search area and existing marker.

The next section will describe a more specific example of marker placement performed by the marking unit 150.

Figure 33A:
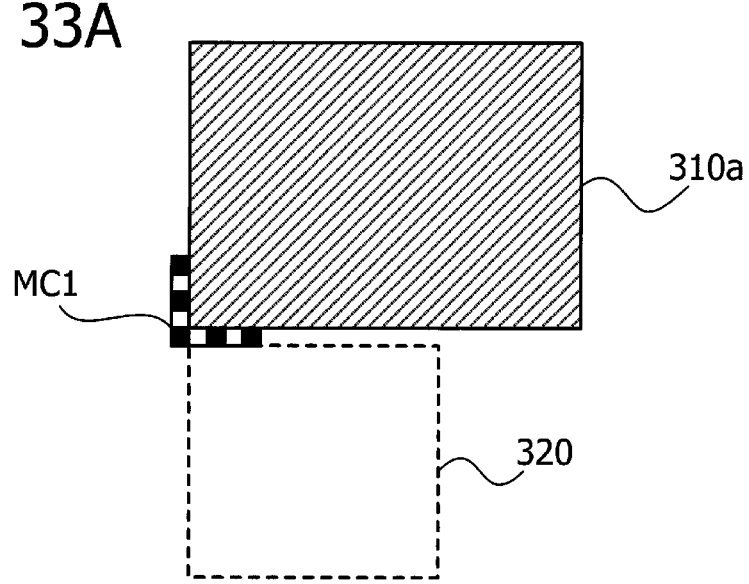
FIGS. 33A and 33B illustrate how markers are placed according to the fourth embodiment.
Figure 33B:
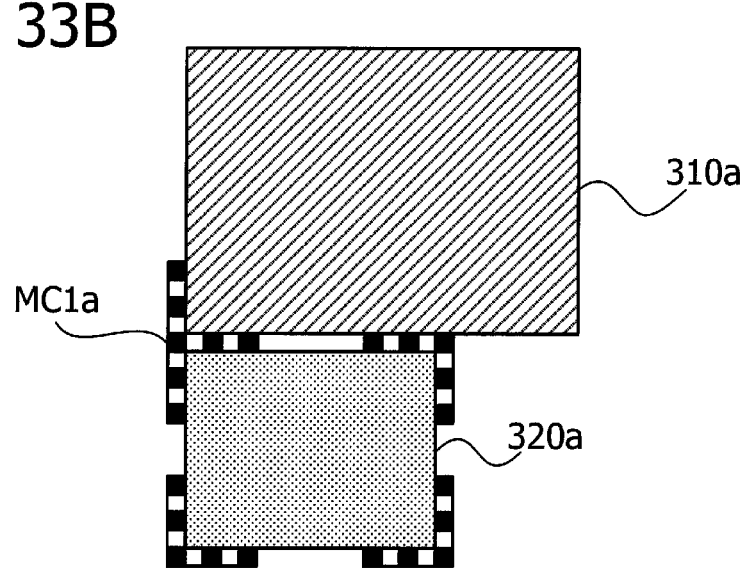

FIGS. 33A and 33B illustrates how markers are placed according to the fourth embodiment. FIG. 33A illustrates the case where an encrypted area 310*a* is located in the vicinity of a designated area 320, and the horizontal bar of an existing marker MC1 is wholly contained in a search area Q1 of the designated area 320. The designated area 320 is then encrypted. FIG. 33B illustrates markers added to the resulting encrypted area 320*a*.

The combination coordinate point determination unit 170 recognizes that the horizontal bar of an existing marker MC1 is wholly contained in a search area Q1 of the designated area 320. Accordingly, the combination coordinate point determination unit 170 tries to place an additive marker at a coordinate point in the overlapping area of the existing marker MC1 and search area Q1. An additive marker M11 is chosen for the purpose since the overlap is in the top portion Qt of the search area Q1. The combination coordinate point determination unit 170 then seeks a position that permits an additive marker M11 to be wholly contained in the search area Q1 without changing the pixel pattern of the existing marker MC1. For example, the combination coordinate point determination unit 170 selects the center of joining position BL1 of the existing marker MC1. The combination coordinate point determination unit 170 then provides the marking unit 150 with the center coordinates as a combination coordinate point.

The marking unit 150 places an additive marker M11 at the combination coordinate point determined by the combination coordinate point determination unit 170, thereby producing a combined marker MC1*a*.

This combined marker MC1*a* may be used to identify a corner point, not only of one encrypted area 310*a*, but also of another encrypted area 320*a*. The image processing apparatus 200 properly locates these encrypted areas 310*a* and 320*a* by detecting their respective markers including the combined marker MC1*a*.

As can be seen from the above, the proposed image processing apparatus 100*b* is configured to produce a combined marker MC1*a* by adding an additive marker M11 to an existing marker MC1 under some specific conditions. This feature contributes to reduction of overlaps of encrypted areas 310*a* and 320*a* with each other's markers. In other words, only a smaller portion of the encrypted areas 310*a* and 320*a* needs interpolation or extrapolation, thus improving efficiency of data decryption at the reading end.

The next section will describe a variation of the above described process of determining marker combination coordinates.

FIG. 34 is a flowchart illustrating a variation of the encryption process according to the fourth embodiment. Each step of this process is described below in the order of step numbers.

(Step S101) The encryption area designation unit 120 receives an input image 300.

(Step S102) The encryption area designation unit 120 permits the user to designate a specific area(s) in the input image 300. It is assumed now that the user has designated two or more areas.

(Step S103) The encryption area designation unit 120 selects one of the designated areas. The order of this selection may be determined in the same way as in step S13 of FIG. 9. Suppose, for example, that there are two designated areas 310 and 320. The encryption area designation unit 120 selects the former area 310 in the first place and informs the encryption unit 130 and marker area detection unit 140 of the selected area.

(Step S104) With reference to control data stored in the control data storage unit 110, the marker area detection unit 140 obtains search areas Q1, Q2, Q3, and Q4 relevant to the designated area informed of by the encryption area designation unit 120. Out of these search areas Q1, Q2, Q3, and Q4, the marker area detection unit 140 detects appropriate marker areas by excluding coordinate points that overlap with other encrypted areas or their associated markers. The marker area detection unit 140 provides the marking unit 150 and combination coordinate point determination unit 170 with the detected marker areas.

(Step S105) The combination coordinate point determination unit 170 determines whether any search area overlap with an existing marker. When an overlap is found, the combination coordinate point determination unit 170 advances the process to step S108. If no overlap is found, the combination coordinate point determination unit 170 advances the process to step S106. This determination of overlaps is achieved by using the foregoing method of step S86 in FIG. 31.

(Step S106) The combination coordinate point determination unit 170 determines whether it is possible to produce an overlap relationship between a search area and an existing marker by modifying the designated area. If it is found to be possible, the combination coordinate point determination unit 170 advances the process to step S107. If it is found to be not possible, the combination coordinate point determination unit 170 advances the process to step S109. Here the term "overlap relationship" refers to a particular state of locational relationships between a search area and an existing marker that can be recognized as an overlap at step S105. More specifically, it means that one element of the existing marker is wholly contained in the search area.

(Step S107) The combination coordinate point determination unit 170 modifies the designated area. For example, the combination coordinate point determination unit 170 expands the designated area in a particular direction (e.g., leftward, rightward, upward, or downward) until the aforementioned overlap relationship is established. Another possible modification may be to move the designated area up to a point at which the aforementioned overlap relationship is established. The combination coordinate point determination unit 170 informs the encryption unit 130 of the modified range of the designated area, and then advances the process to step S108.

(Step S108) The combination coordinate point determination unit 170 tries to combine an additive marker with the existing marker. When this works out properly, the combination coordinate point determination unit 170 obtains and supplies a combination coordinate point to the marking unit 150. When the combination does not work, the combination coordinate point determination unit 170 sends nothing to the marking unit 150.

(Step S109) The encryption unit 130 may have received information about a modified version of the designated area from the combination coordinate point determination unit 170 at step S107. When this is the case, the encryption unit 130 encrypts the modified designated area in the input image 300. When that is not the case, the encryption unit 130 encrypts the original designated area provided from the encryption area designation unit 120. The encryption unit 130 produces and stores control data in the control data storage unit 110 to record which part of the input image 300 is encrypted. For example, this control data may indicate the corner points of the encrypted area.

(Step S110) The marking unit 150 may have previously received a combination coordinate point from the combination coordinate point determination unit 170. When this is the case, the marking unit 150 places an additive marker at that combination coordinate point. When that is not the case, the marking unit 150 consults a relevant priority table 111 in the control data storage unit 110 to find marker positions within a marker area provided from the marker area detection unit 140. The marking unit 150 then places a marker at the highest-priority position in the marker area. The marking unit 150 adds control data to the control data storage unit 110 to record the marked areas (e.g., record the corner positions of each area).

(Step S111) The marking unit 150 determines whether there is any pending designated area in the input image 300. If there is, the marking unit 150 advances the process to step S103. If all the designated area are finished, the marking unit 150 outputs the resulting encrypted image 300a, thus terminating the present process.

As can be seen from the above flowchart, the designated area is modified in the case where step S106 finds no established "overlap relationships." In this case, a combined marker is produced after an "overlap relationship" is produced.

The next section will describe a more specific example of marker placement performed by the marking unit 150 in the present variation.

Figure 35A:
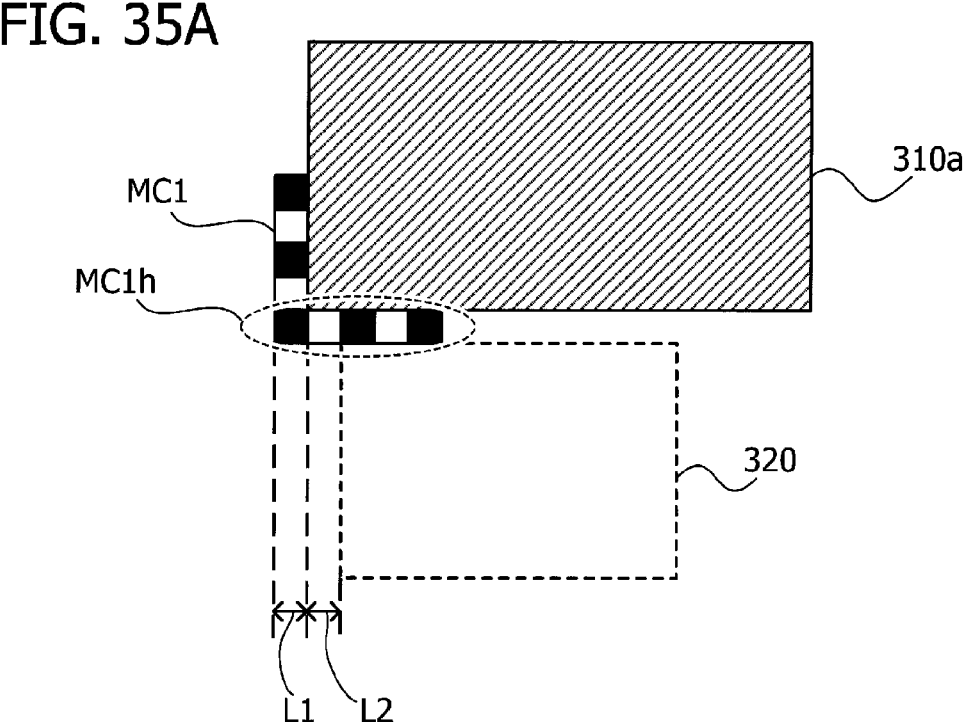
FIGS. 35A and 35B illustrate a variation of the marking process according to the fourth embodiment.
Figure 35B:
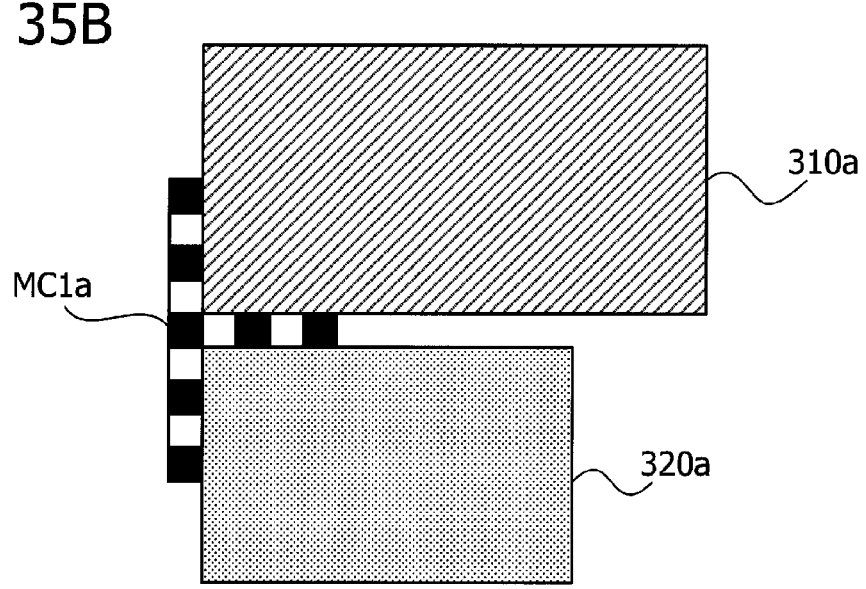

FIGS. 35A and 35B illustrate a variation of the marking process according to the fourth embodiment. FIG. 35A illustrates the case where an encrypted area 310a is located in the vicinity of a designated area 320, and the horizontal bar MC1h of an existing marker MC1 is wholly contained in a search area Q1 of the designated area 320. It is assumed here that the above horizontal bar MC1h is located with a gap of L1 from the search area Q1. The designated area 320 is then encrypted. FIG. 35B illustrates markers added to the resulting encrypted area 320a.

The combination coordinate point determination unit 170 finds it possible to make the search area Q1 contain the horizontal bar MC1h in its entirety by expanding the designated area 320 by a length of L2 in the leftward direction. The combination coordinate point determination unit 170 then executes this expansion of the designated area 320. The combination coordinate point determination unit 170 informs the encryption unit 130 of the new range of the designated area. It is noted that, as an alternative to the expansion, the combination coordinate point determination unit 170 may move the designated area 320 leftward by a distance of L2.

The subsequent processing of the image processing apparatus 100b is basically similar to what have already been described in FIGS. 32 and 33. One difference is that the encryption unit 130 applies data encryption to the modified designated area to produce an encrypted area 320a. Another difference is that the marking unit 150 combines an additive marker M11 with the existing marker MC1, thereby producing a combined marker MC1a.

The above-described variation of the proposed method enables the image processing apparatus 100b to produce a combined marker MC1a by adding an additive marker M11 to an existing marker MC1. This feature increases the chance of creating a combined marker MC1a and thus contributes to reduction of overlaps of encrypted areas 310a and 320a with each other's markers. In other words, only a smaller portion of the encrypted areas 310a and 320a needs interpolation or extrapolation, thus improving efficiency of data decryption at the reading end.

The above-noted image processing apparatus and method make it possible to add markers to an image to properly indicate which part of the image to process.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that various changes, substitutions, and alterations could be made hereto without departing from the spirit and scope of the invention.

What is claimed is:

1. An image processing apparatus comprising:
an area designation unit configured to designate a processing area within an input image;
an image processing unit configured to perform predetermined processing on the processing area;
a marker area detection unit configured to detect a marker area in the input image, the marker area being capable of accommodating a marker that demarcates the processing area, the marker area providing a plurality of possible positions of the marker; and
a marking unit configured to select one of the possible positions in the marker area, based on priority conditions,
wherein the marking unit determines the position to place the marker, based on the priority conditions stored in a control data storage unit, the priority conditions defining different priorities associated with different relative positions of the marker with respect to the processing area, the priorities being successively higher for successively smaller overlapping areas of the marker and processing, the priorities being successively lower for successively larger overlapping areas of the marker and processing.

2. The image processing apparatus according to claim 1, wherein the marker area detection unit detects the marker area as part of the input image, excluding existing processed areas and existing markers placed to demarcate the existing processed areas.

3. The image processing apparatus according to claim 1, wherein the marking unit adds position data to the input image to indicate the relative position corresponding to the position at which the marker is placed.

4. The image processing apparatus according to claim 3, wherein the marking unit places a marker with a different pattern depending on the relative position thereof.

5. The image processing apparatus according to claim 1, wherein the marking unit places, in addition to the marker, a reference marker at a predetermined position in the processing area.

6. The image processing apparatus according to claim 1, further comprising an adjoining marker changing unit configured to detect an adjoining marker that overlaps with the processing area designated by the area designation unit, and replaces the detected adjoining marker with an alternative marker that does not overlap with the processing area, based on the priority conditions.

7. The image processing apparatus according to claim 6, wherein:
the marking unit adds information to the input image to indicate the relative position corresponding to the position at which the marker is placed; and
the adjoining marker changing unit determines which priority has been used to place the adjoining marker, based on the information indicating the relative position, and selects a position to place the alternative marker by using a lower priority than the determined priority.

8. The image processing apparatus according to claim 2, further comprising a combination coordinate point determination unit configured to inform the marking unit of a position for an additive marker to be combined with one of the existing markers so as to form another marker that indicates, similarly to the marker, the processing area designated by the area designation unit,
wherein the marking unit places the additive marker, instead of the marker, at the position informed of by the combination coordinate point determination unit.

9. The image processing apparatus according to claim 8, wherein the combination coordinate point determination unit selects a search area to be searched to determine whether the marker can be placed to demarcate the processing area; and
the combination coordinate point determination unit determines that the equivalent marker for the processing area can be produced when the existing marker overlaps, at least in part, with the search area, and when the additive marker can be wholly contained in the search area, and when the equivalent can be formed in the search area by combining the additive marker with the existing marker.

10. The image processing apparatus according to claim 9, wherein the combination coordinate point determination unit modifies the processing area to enlarge an overlapping area of the search area with the existing marker, when the combination coordinate point determination unit is unable to form another marker that indicates the processing area similarly to the marker.

11. The image processing apparatus according to claim 1, wherein the marking unit places the marker at the determined position after shrinking at least a part of the processing area to vacate an area for placing the marker, when the marker is found to overlap with the original processing area.

12. A method for processing images with an image processing apparatus, the method comprising:
designating, by the image processing apparatus, a processing area within an input image;
performing, by the image processing apparatus, predetermined processing on the processing area;
detecting, by the image processing apparatus, a marker area in the input image, the marker area being capable of accommodating a marker that demarcates the processing area and providing a plurality of possible positions for the marker; and
selecting, by the image processing apparatus, one of the possible positions in the marker area, based on priority conditions,
wherein a position to place the marker is determined based on priority conditions, the priority conditions defining different priorities associated with different relative positions of the marker with respect to the processing area, the priorities being successively higher for successively smaller overlapping areas of the marker and processing and the priorities being successively lower for successively larger overlapping areas of the marker and processing.

* * * * *